United States Patent
Abello et al.

(10) Patent No.: US 8,123,201 B2
(45) Date of Patent: Feb. 28, 2012

(54) FLEXIBLE AERATION PANEL AND METHODS OF USE

(75) Inventors: Jose Francisco Abello, Weston, FL (US); Ernesto Juan Iznaga, North Palm Beach, FL (US)

(73) Assignee: Parkson Corporation, Fort Lauderdale, FL (US)

( * ) Notice: Subject to any disclaimer, the term of this patent is extended or adjusted under 35 U.S.C. 154(b) by 0 days.

(21) Appl. No.: 12/836,916

(22) Filed: Jul. 15, 2010

(65) Prior Publication Data

US 2010/0283163 A1  Nov. 11, 2010

Related U.S. Application Data

(62) Division of application No. 11/586,727, filed on Oct. 26, 2006, now Pat. No. 7,806,389.

(60) Provisional application No. 60/730,016, filed on Oct. 26, 2005.

(51) Int. Cl.
    *B01F 3/04* (2006.01)
(52) U.S. Cl. ............... 261/122.1; 261/122.2
(58) Field of Classification Search ............... 261/122.1, 261/122.2, 124, DIG. 70
    See application file for complete search history.

(56) References Cited

U.S. PATENT DOCUMENTS

| 512,467 | A | | 1/1894 | Eubank |
|---|---|---|---|---|
| 1,547,548 | A | * | 7/1925 | Allen, Jr. et al. ............... 209/170 |
| 1,792,286 | A | * | 2/1931 | Curry et al. ............... 261/122.2 |
| 3,432,154 | A | | 3/1969 | Danjes |
| 3,642,260 | A | | 2/1972 | Danjes et al. |
| 3,802,676 | A | | 4/1974 | Thayer |
| 3,846,517 | A | | 11/1974 | Ross |
| 3,880,965 | A | | 4/1975 | Dudis et al. |
| 4,029,581 | A | | 6/1977 | Cough, Jr. et al. |
| 4,290,982 | A | * | 9/1981 | Bauman ............... 261/124 |
| 4,478,766 | A | * | 10/1984 | Horikita et al. ............... 261/124 |
| 4,606,867 | A | * | 8/1986 | Eguchi ............... 261/122.1 |
| 4,624,781 | A | | 11/1986 | Messner |
| 5,015,421 | A | | 5/1991 | Messner |

(Continued)

FOREIGN PATENT DOCUMENTS

AT  391 126 B  8/1990

(Continued)

OTHER PUBLICATIONS

Menburen-Paneru-Shiki Sankisouchi Gijutsu Manyuaru (Technical Manual of Membrane Panel Type Air Diffusion Device), Japan Institute of Wastewater Engineering Technology, Mar. 2005, (excerpts, partial translation).

(Continued)

*Primary Examiner* — Charles Bushey
(74) *Attorney, Agent, or Firm* — Gilberto M. Villacorta; Matthew J. Kremer; Foley & Lardner LLP

(57) ABSTRACT

A flexible aeration panel is described, which does not include a rigid support plate. The flexible aeration panel can include a first perforated, flexible sheet sealed to a second non-perforated flexible sheet at their peripheral edges, thereby defining one or more cavities that are in fluid communication with at least one gas inlet. The flexible aeration panel can be configured to produce preferably evenly spaced bubbles of gas when positioned in a liquid body. Applications include, but are not limited to, aeration of wastewater, lakes, streams, water basins and the like.

13 Claims, 17 Drawing Sheets

U.S. PATENT DOCUMENTS

| | | | |
|---|---|---|---|
| 5,098,581 A * | 3/1992 | Roediger | 210/758 |
| 5,192,467 A | 3/1993 | Strunc et al. | |
| 5,352,391 A | 10/1994 | Heck | |
| 5,532,391 A | 7/1996 | DeLuca et al. | |
| 5,690,864 A | 11/1997 | Tyer | |
| 5,868,971 A | 2/1999 | Meyer | |
| 5,868,972 A * | 2/1999 | Galich et al. | 261/122.1 |
| 6,367,783 B1 | 4/2002 | Raftis | |
| 6,406,005 B1 | 6/2002 | Lawson et al. | |
| 6,558,549 B2 | 5/2003 | Cote et al. | |
| 6,645,374 B2 | 11/2003 | Cote et al. | |
| 6,764,629 B2 | 7/2004 | Shepard et al. | |
| 6,797,215 B2 | 9/2004 | Bonk et al. | |
| 6,846,534 B2 | 1/2005 | Bonk et al. | |
| 7,044,453 B2 | 5/2006 | Tharp | |
| 7,806,389 B2 * | 10/2010 | Abello et al. | 261/122.1 |

FOREIGN PATENT DOCUMENTS

| | | |
|---|---|---|
| DE | 29 42 698 A1 | 5/1981 |
| DE | 87 06 219 U1 | 9/1988 |
| DE | 42 13 316 A1 | 10/1993 |
| EP | 0 229 386 A1 | 7/1987 |
| EP | 0 747 031 B1 | 12/1996 |
| EP | 0 761 294 A1 | 3/1997 |
| WO | WO-93/25484 A1 | 12/1993 |

OTHER PUBLICATIONS

Notice mailed Sep. 14, 2010 from Japan Patent Office (JPO) including Submission of Information on Feb. 24, 2010 by a third party, with translation.

* cited by examiner

FLEXIBLE AERATION PANEL AND METHODS OF USE

CROSS-REFERENCE TO RELATED APPLICATIONS

This application is a Divisional of U.S. application Ser. No.: 11/586,727, filed Oct. 26, 2006, now U.S. Pat. No. 7,806,389, which claims the benefit and priority of U.S. Provisional Application No.: 60/730,016 filed Oct. 26, 2005. The foregoing applications are incorporated by reference herein in their entirety.

BACKGROUND

The invention generally relates to aeration panels for introducing bubbles of gas, such as air, into a liquid body, including a tank of water, water basin, reservoir, or lake.

Conventional aeration panel structures having an upper portion consisting of a membrane mounted on a lower portion consisting of a flat, rigid plate are known, for example U.S. Pat. No. 5,192,467. Such structures have peripheral hold-down strips, which secure the membrane to the rigid plate. Middle hold-down strips are also provided to prevent billowing of the membrane. Adjustable anchor bolts hold the aeration panel structure to the bottom of a liquid container. Such panels are heavy, unwieldy when large, and difficult to transport and install. For this rigid plate approach, different materials, such as stainless steel or non-flexible plastic plates, are joined to flexible upper membrane sheets using screws, clamps or adhesives. Examples of other conventional aeration panel structures are also discussed in U.S. Pat. No. 5,192,467. Other aeration panel structures are also known, such as aeration panels described in German Patent Publication No. 29 42 697 and EP Patent Publication No. 0 229 386. Another example is U.S. Pat. No. 4,624,781, which describes a panel-type air diffusion device having an upper flexible membrane that is clamped to a lower rigid support plate. A further example is U.S. Pat. No. 5,015,421, which discloses a flexible membrane clamped to a rigid support with continuous clamping arrangements rather than point attachments, such as screws or rivets.

Still other aeration panels are known. For example, U.S. Pat. No. 6,406,005 discloses a rigid base plate and a perforated elastomeric membrane secured to the rigid base plate by sealing strips pressed along the edges of the membrane into corresponding grooves in the rigid base plate. Additionally, U.S. Pat. No. 5,532,391 describes a gas distributor including a base plate over which a perforated diaphragm is stretched and in which excessive expansion of the diaphragm is prevented by an upper grating. Furthermore, EP Publication No. 0 761 294 discloses an aerator panel with a perforated membrane secured to a support plate at the periphery and at central points on the panel while EP Publication No. 0 747 031 describes an anatomically shaped air bubble mat for use in a bathtub.

U.S. Pat. Nos. 6,558,549 and 6,645,374 teach a membrane module for gas transfer composed of a flexible oxygen-permeable membrane that is impermeable to liquid water. Because of the apparent absence of macroscopic perforations (instead alternative membranes are permissibly constructed of microporous hydrophobic materials), this apparatus does not produce bubbles in operation. Also, the apparatus is described as having a non-rigid restraint system and appears relatively flat.

All of the known aeration panels, especially the rigid support plate varieties, are heavy, expensive and difficult or unwieldy to install and maintain.

SUMMARY

A flexible aeration panel is provided, which does not make use of a rigid support plate, thus eliminating excessive weight, bulk, cost, and problematic installation. The flexible aeration panel according to an embodiment of the present invention can supply air, oxygen, or other gases to biological wastewater treatment plants and lakes depleted, or in need, of certain gaseous nutrients, such as oxygen.

In certain embodiments of the present invention, the flexible aeration panel may comprise an upper portion and a lower portion. The upper portion can comprise a flexible, elastomeric material harboring holes, slits, cut shapes, or otherwise perforated. The lower portion can comprise a flexible elastomeric material, which may be the same as or different from the flexible elastomeric material of the upper portion. The upper portion can be sealed via a weld, chemical bonding, vulcanization, stitching, or an adhesive and the like to the lower portion, thus defining one or more, preferably two or more, cavities. Anchors and the like may be used to secure the flexible aeration panel to a certain location.

According to various embodiments of the present invention, the flexible aeration panel can take the form of many perimeter shapes, including, but not limited to, a square, a rectangle, a triangle, a circle, an ellipse, a doughnut, a cylinder, a crescent, a cube, pyramid, a cone, and a prism. The internal geometry of the aeration panel may follow the perimeter shape, thus creating a single cavity or multiple cavities that allow the circulation and distribution of air to the entire inflated volume.

The gas can be delivered to the flexible aeration panel using a feed pipe through a single inlet or multiple inlets, which may be positioned about the perimeter of the flexible aeration panel or at an interior portion of the flexible aeration panel. Multiple flexible aeration panels can be arranged in a discrete fashion, with each having its own feed pipe or with the panels being fitted together to share gas being distributed at the ends of the series of panels.

The aeration panels can be restrained near the bottom of a body of liquid or container by use of one or more fixing devices, such as anchor rods, bolts, cable, chains and the like. These fixing means can be attached directly to certain portions of the flexible aeration panel or to an optional structural frame, which may be positioned about the periphery of the flexible aeration panel.

The aeration panels can be restrained also by a level array of cables in tension. For example, the restraining cables can be anchored to the concrete walls and/or to the floor of the basin or container. Cable tension can be obtained by turnbuckles acting on the cable and the anchors. One cable can support two or more aeration panels by having the ends of the cable fixed at one wall and providing turns pivoted by, for example, eyebolts fixed at an opposite wall.

The position of the aeration panels can be arranged in a variety of configurations. For example, aeration panels could be arranged in rows or in a staggered configuration as required by the surface coverage.

The flexible aeration panel can used in a variety of applications, for example, for the aeration of water tanks, water basins, or sludge. The aeration panel can also be utilized in various aerobic water processes.

According to another embodiment of the present invention, a method of distributing a gas through a liquid body is provided. The method may comprise: (i) positioning within the liquid body one or more flexible aeration panels, each panel having at least one inlet and at least an upper portion and a lower portion, which portions define at least one cavity that can be filled with a gas under pressure, which pressurized gas flows to each panel and into the at least one cavity via the at least one inlet, the upper portion of each panel being perforated to allow the pressurized gas to escape in the form of bubbles from the upper portion of each panel; (ii) providing a source of the pressurized gas; and (iii) permitting the pressurized gas to flow to each panel and into the at least one cavity via the at least one inlet. The at least upper portion and lower portion of each panel can be constructed of one or more flexible, non-rigid elastomeric materials.

The term "liquid body" can include a liquid body having a volume substantially greater than that of a bathtub, a hot tub, or a recreational swimming pool. Also, preferred flexible, non-rigid elastomeric materials may have a density of less than about 1.0 gm/mL. More preferably, the panel according to one embodiment of the present invention can further comprise a structural frame positioned at or about the periphery of the aeration panel.

Still other embodiments of the present invention can include distributing a gas through a liquid body comprising the steps of (i) positioning within the liquid body one or more flexible aeration panels, each panel having at least one inlet and at least an upper portion and a lower portion, which portions define at least one cavity that can be filled with a gas under pressure, which pressurized gas flows to each panel and into the at least one cavity via the at least one inlet, the upper portion of each panel being perforated to allow the pressurized gas to escape from the upper portion of each diffuser in a manner that provides a substantially uniform, unbroken pattern of gas bubbles over a substantial area thereof; (ii) providing a source of the pressurized gas; and (iii) permitting the pressurized gas to flow to each panel and into the at least one cavity via the at least one inlet. The at least upper portion and lower portion of each panel can be constructed of one or more flexible, non-rigid elastomeric materials.

In a preferred embodiment of the present invention, a flexible aeration panel for distributing a gas through a liquid body is described which can comprise: (i) at least one inlet; and (ii) at least an upper portion and a lower portion, which portions define at least one cavity in fluid communication with the at least one inlet and capable of being filled with a gas under pressure. The upper portion can be perforated to allow pressurized gas to escape therefrom in the form of bubbles. Also, the at least upper portion and lower portion of the panel can be constructed of one or more flexible, non-rigid elastomeric materials.

More preferably, a flexible aeration panel for distributing a gas through a liquid body is contemplated which can comprise: (i) at least one inlet; (ii) at least an upper portion and a lower portion, which portions define at least one cavity in fluid communication with the at least one inlet and capable of being filled with a gas under pressure, the upper portion being perforated to allow pressurized gas to escape therefrom in a manner that provides a substantially uniform, unbroken pattern of gas bubbles over a substantial area thereof. The at least upper portion and lower portion of the panel can be constructed of one or more flexible, non-rigid elastomeric materials having a density of less than about 1.0 gm/mL. Also, the panel can be equipped with a structural frame positioned at or about the periphery of the panel and does not include a rigid support plate positioned at or against the lower portion of the panel.

The perforations can come in a variety of sizes and shapes including, but not limited to, holes, slits, cuts, or combinations thereof. The dimensions of the perforations can come in many sizes but are preferably in the range of about 0.1 mm to about 10 mm, more preferably in the range of about 0.2 mm to about 5 mm and most preferably in the range of about 0.5 mm to about 3.0 mm. The perforations can be arranged in many different ways, including randomly or in symmetrical geometric forms, such as triangles, stars or in a rectangular fashion. The density of the perforations can also vary widely and is determined by a ratio of open (perforated) to solid (non-perforated) areas. Such a ratio can range from about 5% to about 95% open area, preferably from about 15% to about 75% open area, and more preferably from about 30% to about 50% open area.

In a preferred embodiment of the present invention, the at least upper portion and lower portion can be comprised of flexible, non-rigid elastomeric sheets whose edges are sealed. Sealing is accomplished in any number of ways known in the art including, but not limited to, welding, chemical bonding, vulcanization, stitching, gluing, or combinations thereof.

Moreover, the flexible aeration panel of the invention can take the form of many shapes including, but not limited to, a square, a rectangle, a triangle, a circle, an ellipse, a doughnut, a cylinder, a crescent, a cube, a pyramid, a cone, and a prism, and the like. The flexible aeration panel can also be anchored at or near the bottom of the liquid body via anchor rods, cable, chains, spikes, pegs, or combinations thereof either directly or through a structural frame which is preferably positioned at the perimeter of the flexible aeration panel. The circumscribed structural frame can, in turn, be attached to the flexible aeration panel by a variety of attachment means, which are evident to those of ordinary skill in the art. Furthermore, a spacer associated with the anchor points for spacing the panel from the bottom of the liquid body can be utilized to advantage.

In certain embodiments of the present invention, the upper portion and lower portion can also be sealed at one or more interior sections of the panel, thereby defining two or more cavities, which are in fluid communication with the at least one inlet. These two or more cavities may follow the shape of the perimeter of the panel. The introduction of gas can be accomplished using a suitable gas flow rate, for example, at a rate of about 5 to about 74 cm$^3$/min/m$^2$ of the upper portion, preferably at a rate of about 15 to about 54 cm$^3$/min/m$^2$ of the upper portion, and more preferably at a rate of about 25 to about 44 cm$^3$/min/m$^2$ of the upper portion. Of course, the gas can be chosen to be any gas suitable for the particular application. The gas might be oxygen, nitrogen, carbon dioxide or simply air, for instance.

A variety of flexible, non-rigid elastomeric materials can be used with which to construct the panel's upper and/or lower portions. These materials include, but are not limited to, polyurethanes, poly(vinyl chloride), polycarbonates, acetals and poly(acetals), nylons and the like.

It is to be understood that both the foregoing general description and the following detailed description are exemplary and explanatory only, and are not restrictive of the invention as claimed.

BRIEF DESCRIPTION OF THE DRAWINGS

The features, aspects, and advantages of the present invention will become apparent from the following description, appended claims, and the accompanying exemplary embodiments shown in the drawings, which are briefly described below.

DETAILED DESCRIPTION

Figure 1:
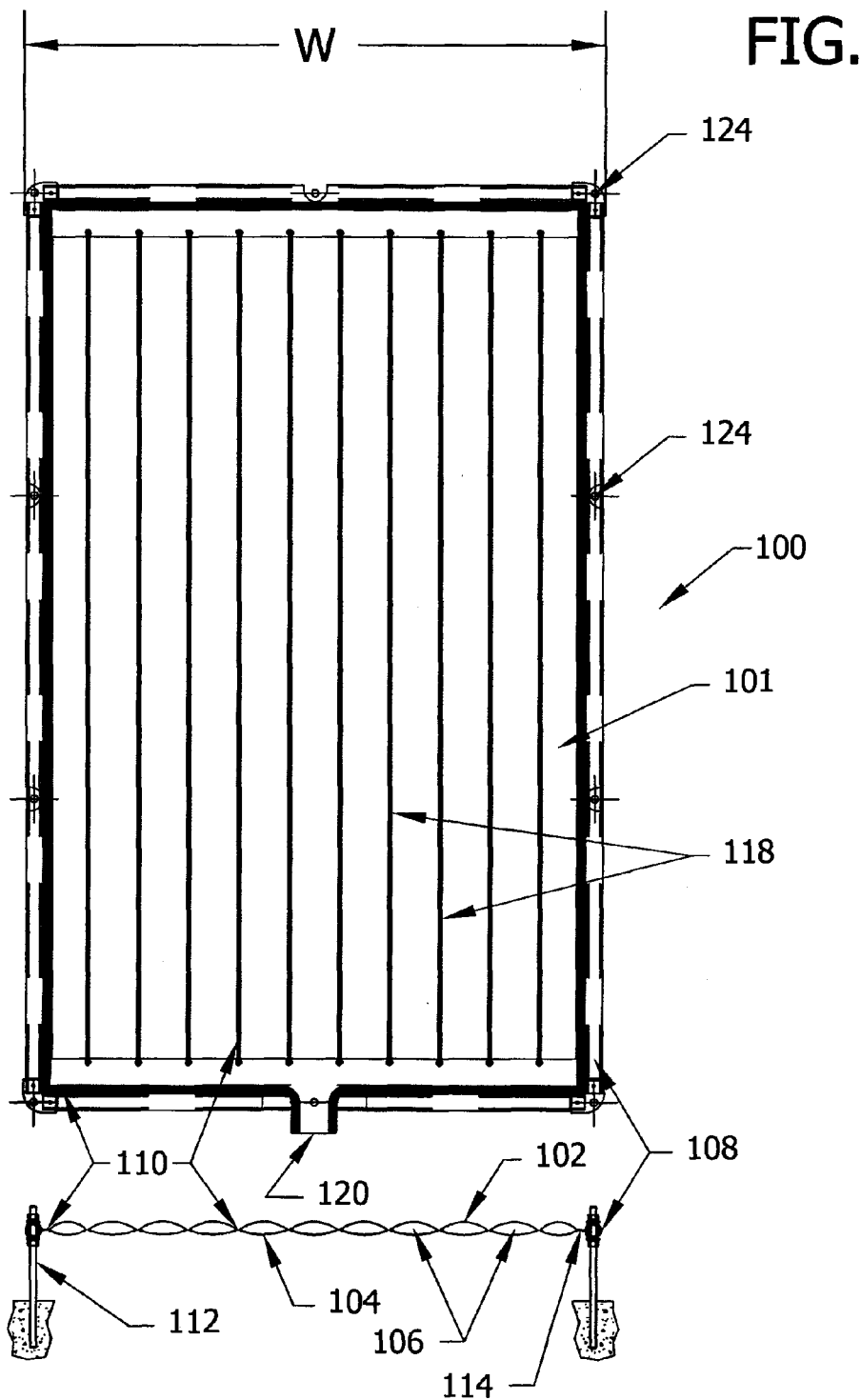
FIG. 1 are top and side views showing a representative rectangular flexible aeration panel according to an embodiment of the present invention.

Various embodiments will now be explained with reference to the drawings. FIG. 1 depicts an embodiment of the aeration panel assembly 100 with an aeration panel 101 in a rectangular shape, a frame 108, and anchoring devices 112. The flexible aeration panel 101 may comprise an upper portion or sheet 102 and a lower portion or sheet 104. The upper portion 102 can comprise a flexible, elastomeric material harboring holes, slits, cut shapes, or otherwise perforated. The lower portion 104 can also comprise a flexible elastomeric material, which may be the same as or different from the flexible elastomeric material of the upper portion 102.

As to the perforations in the upper portion, the perforations can be configured in such a manner that a substantially uniform, unbroken pattern of gas bubbles can be provided over a substantial area of the upper portion 102 when gas flows through the aeration panel 101. Also, the perforations can come in a variety of sizes and shapes including, but not limited to, holes, slits, cuts, or combinations thereof. The dimensions of the perforations can come in many sizes but are preferably in the range of about 0.1 mm to about 10 mm, more preferably in the range of about 0.2 mm to about 5 mm and most preferably in the range of about 0.5 mm to about 3.0 mm. The perforations can be arranged in many different ways, including randomly or in symmetrical geometric forms, such as triangles, stars or in a rectangular fashion. The density of the perforations can also vary widely and is determined by a ratio of open (perforated) to solid (non-perforated) areas. Such a ratio can range from about 5% to about 95% open area, preferably from about 15% to about 75% open area, and more preferably from about 30% to about 50% open area.

The material for the perforated upper portion 102 and non-perforated lower portion 104 can be constructed from a variety of flexible, non-rigid elastomeric materials. For example, these materials include, but are not limited to, polyurethanes, poly(vinyl chloride), polycarbonates, acetals and poly(acetals), nylons, polyethylene, polypropylene, chlorinated polyvinyl chloride, acrylic, vinyl acetate, and other plastics and the like, which can be made into flexible, gas impermeable sheets. Indeed, any flexible, non-rigid elastomeric material having a density of less than about 1.0 gm/mL can be used. In addition, natural and synthetic woven fabrics may also be used. Further examples of suitable materials for the upper and lower portions are described, for instance, in U.S. Pat. Nos. 6,846,534; 6,797,215; and 6,764,629, the disclosures of which are incorporated by reference herein. Use of such sheeting generally provides panels that do not suffer from the drawbacks of the devices of the prior art, such as those drawbacks associated with differing thermal expansion rates between rigid supporting plates and flexible elastomeric panels. Such differing thermal expansion rates can cause stress at one or more attachment points. In a preferred embodiment, the upper and lower portions of the panels are made of the same (or different type of) flexible, non-rigid elastomeric material. In another embodiment of the present invention, the lower portion can be formed by at least one layer of fabric imbibed or otherwise attached within two or more layers of elastomeric materials, such as polyurethane or polyester. In such a case, the fabric can be nylon, polyester, rayon, Kevlar, etc. In another embodiment, the lower portion can comprise one layer of fabric between two layers of elastomeric material but other arrangements are possible. For example, two layers of fabric and three layers of elastomeric material can form a structure in which the layers of elastomeric material and the layers of fabric are alternately disposed.

The aeration panel 101 can be formed by sealing the upper portion 102 to the lower portion 104, thus defining one or more cavities 106 using one or more seals 110. The seals 110 can include one or more of the following: a weld, chemical bonding, vulcanization, stitching, an adhesive, and the like. In one embodiment, the flexible aeration panel may be formed by seals between the upper portion 102 and the lower portion 104 at the edges or periphery 114 of one or both of the upper and lower portions.

Additional seals 110 can extend across central regions 118 (or interior sections) near to the edges about the periphery 114, which create a plurality cavities 106 along longitudinal, transverse, or conical lines within the aeration panel 101, for example, in the manner of a ribbed flotation device. The multiple cavities 106, defined by the longitudinal, transverse, or conical seal lines 110 between the upper and lower portions, can provide the advantages of preventing the panel from billowing up when air is introduced and possibly exerting excessive strain on the attachments between a peripheral structural frame 108 and a flexible aeration panel 101, or causing uneven distribution of the air bubbles generated by the panel 101. The seals 110 in the central regions 118 are formed by attaching the upper portion 102 and the lower portion 104 along selected lines using an adhesive, melting methods, sewing, or other physical attachment methods. Such multiple cavity arrangements provide some rigidity to the overall structure of the aeration panel 101. Also, multiple cavity arrangements, together with the perforations on the upper portion 102 provide a plurality of large, relatively unobstructed passages for the flow of gases at high rates to all regions of the aeration panel 101, providing efficient aeration to the liquid body using an even distribution pattern of gas bubbles. In one embodiment, two or more cavities are formed, which follow the shape of the perimeter of the panel.

Figure 10:
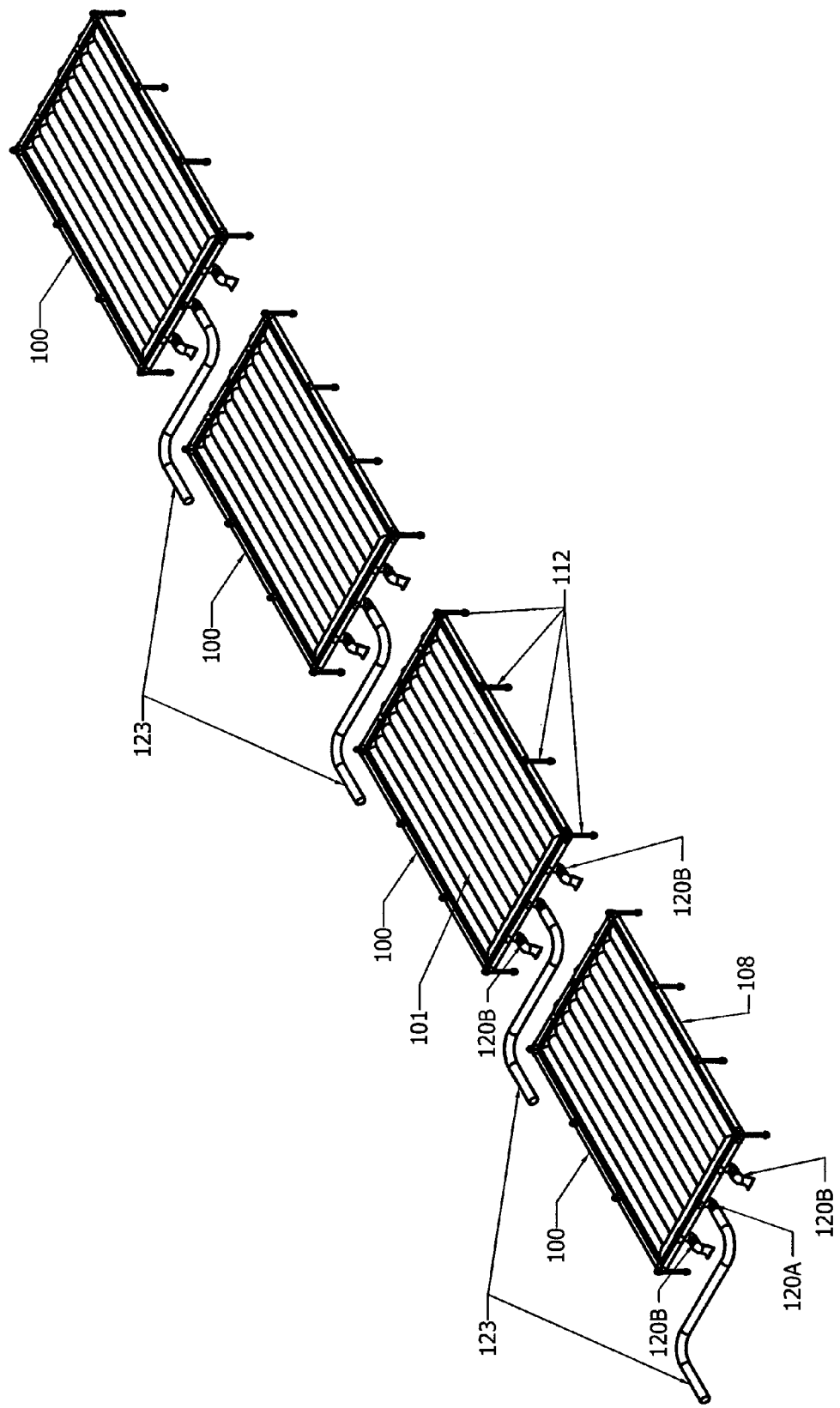
FIG. 10 is perspective view showing four aeration panels assembled in a discrete configuration according to an embodiment of the present invention.

Additionally, the aeration panel 101 also includes a gas inlet 120 so gas can be delivered to the flexible aeration panel 101 using a feed pipe 123 (such as shown in FIG. 10). The feed pipe 123 is connected to a gas source (not shown) for providing gas to the aeration panel 101. Any suitable gas can be used. For example, the flexible aeration panel 101 according to various embodiments of the present inventions can supply air, oxygen, and/or other gases to biological wastewater treatment plants and/or lakes depleted, or in need, of certain gaseous nutrients, such as oxygen.

Figure 11:
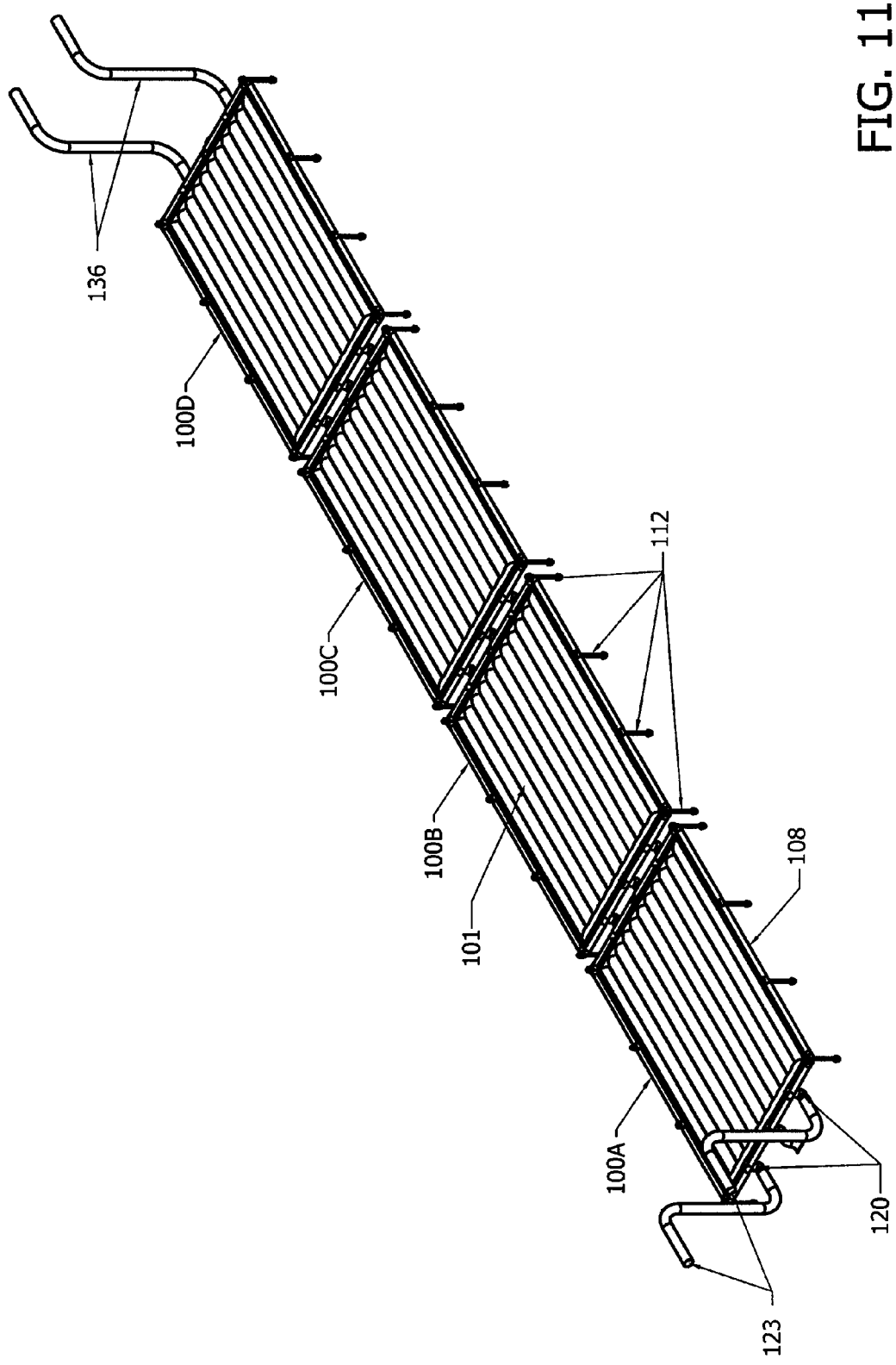
FIG. 11 is perspective view showing four aeration panels assembled in a series configuration according to another embodiment of the present invention.

The inlet 120 can be a single inlet as shown in FIG. 1 or multiple inlets as shown in FIG. 11, which may be positioned about the perimeter of the flexible aeration panel 101 as shown in FIG. 1 or an interior portion of the flexible aeration panel near a central region 108. The gas from the gas source is delivered under pressure to the cavities 106 via the feed pipe 123 and the gas inlet 120.

Figure 3:
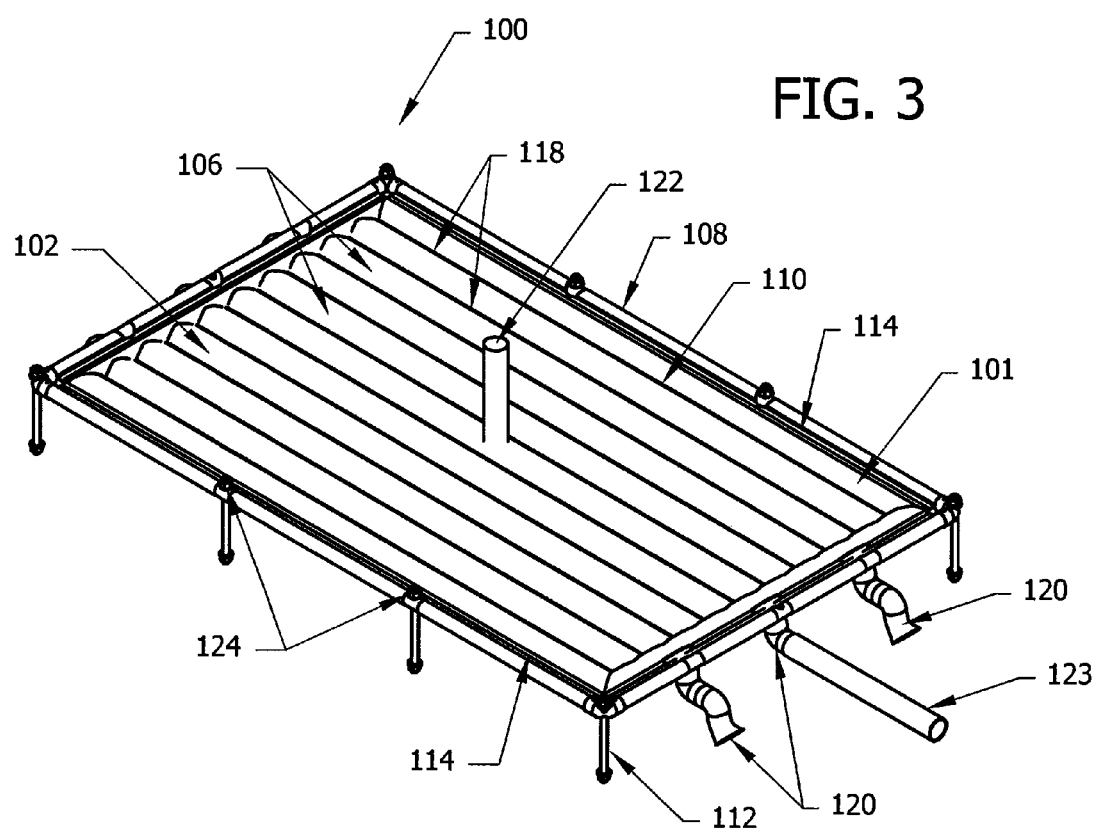
FIG. 3 is a perspective view showing an aeration panel in greater detail, including multiple inlets, an air feed pipe, and a structural frame.

As gas fills the one or more cavities 106, the aeration panel 101 expands, and gas is permitted to exit through the perforations in the upper portion 102. Additionally, there can be an optional gas outlet 122 provided in a region that enhances the even distribution of gas throughout the panel (such as shown in FIG. 3) or provided so as to connect two or more aeration units in series (as will be described later).

The rate of gas flowing through an aeration panel 101 can depend on its size and shape of the panel 101 as well as the types and configurations of the perforations of the upper portion 102 and the presence of an optional gas outlet 122. Examples of gas flow rates include those that range from about 5 to about 74 $cm^3/min/m^2$ of the upper portion, preferably at a rate of about 15 to about 54 $cm^3/min/m^2$ of the upper portion, and more preferably at a rate of about 25 to about 44 $cm^3/min/m^2$ of the upper portion.

As shown in FIG. 1, the flexible aeration panel assembly 100 may optionally include a structural frame 108, which can be disassembled and can preferably counteract the buoyancy forces of the aeration panel 101. In one preferred embodiment, the structural frame 108 can be attached along the edges of the aeration panel 101 along its periphery 114. In this way, the perforated upper portion 102 may be securely sealed to the supporting lower portion 104 around its periphery 114. Thus, the aeration panel 101 can be held under water without creating high-stress points localized at rivets or screws in the central regions 118, which could weaken the upper and lower portions in those regions and obstruct gas flow. The structural frame 108 of FIG. 1 generally circumscribes the periphery 114 of the aeration panel 101.

The structural frame 108 can be made from a variety of suitable materials, such as metal or plastic such as PVC. In addition, the frame can have any suitable configuration. For example, the structural frame 108 of the embodiment shown in FIG. 1 can have a width W of about 0.1 to about 3 meters and have a length L of about 1 to about 5 meters long. Furthermore, the structural frame 108 can have a series of attachment points 124, such as apertures, along each side of the frame 108 through which anchoring devices 112, such as bolts, anchor rods, or cables, are inserted.

The anchoring device 112 can be used to anchor, secure, or restrain the aeration panel assembly 100 to a certain location, such as at or near the bottom of a tank, a basin, a container, or the like where the aeration panel assembly 100 is installed. The anchoring devices 112 can by any type of fixing device known in the art, such as anchor rods, bolts, cable, or the like or any combination thereof. These anchoring devices 112 can be attached directly to certain portions of the flexible aeration panel 101 or to the optional structural frame 108 positioned about the periphery 114 of the flexible aeration panel 101. Usually, a plurality of anchoring devices are used which form an anchoring array. The anchoring array can have adjustable individual anchoring devices such that the flexible panel can be positioned within a liquid body by the anchoring array which permits the leveling of the flexible panels relative to a surface of the liquid body. In other words, the anchoring devices in the anchoring array permit the top and bottom planar surfaces of the aeration panel to run parallel to the top surface of the liquid body by adjusting the height of the attachment point of the aeration point relative to the length of anchoring devices.

In the embodiment shown in FIG. 1, the anchoring devices 112 form an anchoring array using anchor rods that are fed through the attachment points 124 (i.e., apertures) of the structural frame 108, which may be widely spaced on the frame. Nuts along the anchoring rods can secure the frame structure 108 to the anchoring rods. Furthermore, the nuts securing the frame structure to the anchoring rods can be adjusted along the length of the anchoring rod so that each attachment point 124 can be raised or lower. By adjusting these attachment points in this manner, the entire aeration panel 101 can be made level to the top surface of the liquid body, i.e., the top and bottom planar surface of the aeration panel 101 can run parallel to the top surface of the liquid body. Using this kind of configuration, the aeration panel 101 and/or the structural frame 108 can be securely affixed, and thus, the floatation of the aeration panel can be prevented without requiring a massive structure or ballast.

Additionally, one or more of the anchoring devices 112 may include the use of anchor bolts with appropriate spacers for defining the distance between the aeration and the bottom of the aeration tank, basin, container, or the like and leveling arrangements or adjustment hardware to permit leveling of the panel when it is mounted in the aeration tank, basin, container, or the like. For example, each anchor point may have a spacer and/or adjustment hardware so as to permit the leveling of the aeration panel relative to the surface of the liquid body.

Additionally or alternatively, the aeration panels 101 can be restrained also by an anchoring array in the form of a level array of cables in tension as shown in FIGS. 12-15, which will be described later.

As discussed above, in the embodiment of FIG. 1, a flexible aeration panel assembly 100 includes a rectangular aeration panel 101 with a perforated upper portion 102 joined along seams 110 to a non-perforated lower portion 104 forming a plurality of cavities 106. In one embodiment, there can be one or more cavities 106. In another embodiment, the one or more cavities 106 can be, preferably, two or more cavities. In the case of FIG. 1, the rectangular aeration panel 101 comprises eleven elongated cavities. In addition, there is one gas inlet 120. However, other embodiments of the aeration panel 101 are contemplated. For example, according to various embodiments of the present invention, the flexible aeration panel can take the form of many perimeter shapes including, but not limited to, a square, a rectangle, a triangle, a circle, an ellipse, a doughnut, a cylinder, or a crescent, and the form of many three-dimensional shapes such as a cube, a pyramid, a cone, and a prism. In addition, the internal geometry of the aeration panel may follow the perimeter shape, thus creating a single cavity or multiple cavities that allow the circulation and distribution of air to the entire inflated volume.

Figure 2:
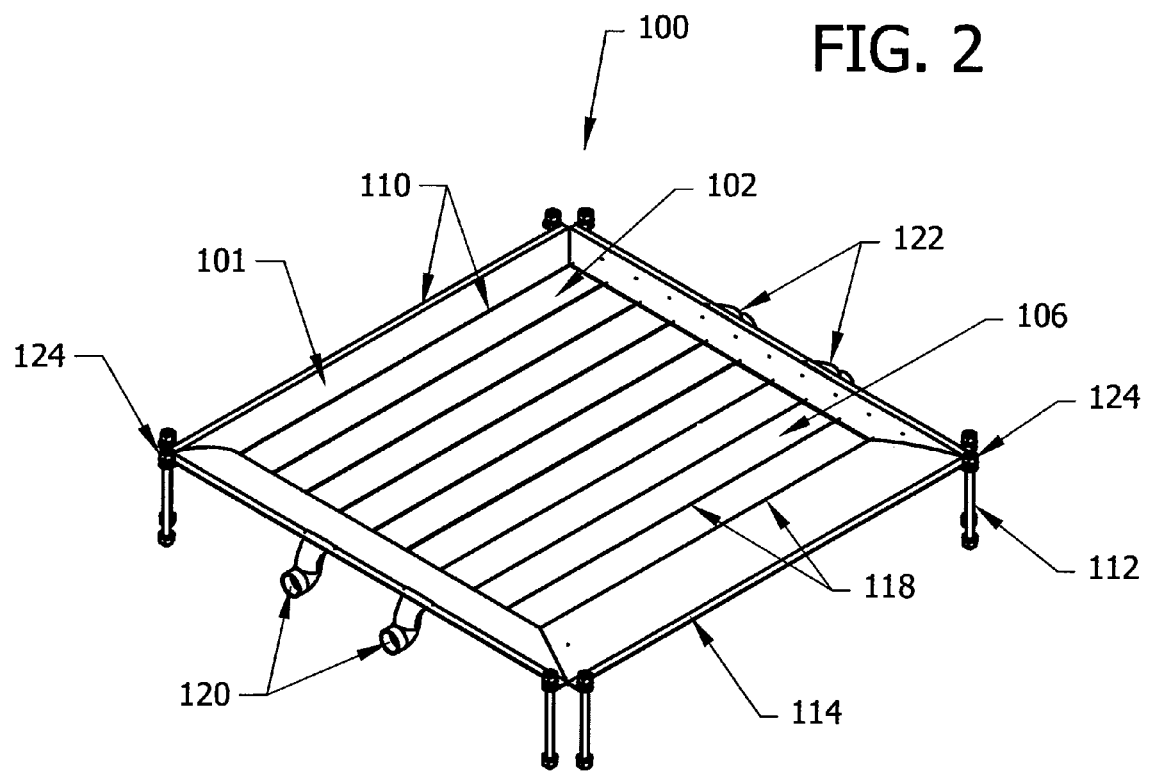
FIG. 2 illustrates a square flexible aeration panel according to another embodiment of the present invention.

FIG. 2 shows an embodiment of the aeration panel assembly 100, which comprises an aeration panel 101 that is in the shape of a square. The aeration panel assembly includes two gas inlets 120 and two gas outlets 122 that are located on the opposite sides of the aeration panel 101. The gas outlets 122 can be connected to feed pipes 123 that lead to another set of gas inlets for another aeration panel assembly, which is connected in series with the depicted aeration panel assembly 100. Having various aeration panel assemblies connected in series provides the ability of aerating a greater volume of liquid without increasing the size of an individual aeration panel assembly. In one embodiment, two or more aeration panel assemblies can be in series, for example, three, four or five units can be in a series.

The perforated upper portion and the lower portion of the aeration panel form one or more cavities 106 through the use of seals 110 formed along the periphery 114 of the upper and lower portions as well as seals 110 formed along the longitudinal direction of the gas flow in the central regions 118 of the aeration panel 101.

The aeration panel 101 can be secured to the bottom of an aeration tank, container, basin, or the like through the use of anchoring devices 112, such as anchor rods. The anchoring device 112 can, for example, be attached at attachment points 124 along the periphery 114 of the aeration panel 101 at apertures that are located outside of the seal 110 that runs along the periphery 114 but inside the outer edge of the aeration panel 101. Alternatively, a structural frame can be attached along the periphery 114 of the aeration panel with apertures along the frame to act as attachment points so that the anchoring device can be fed through and/or attached to the structural frame.

FIG. 3 shows an embodiment of the aeration panel assembly 100, which comprises an aeration panel 101 that is in the shape of a rectangle. The aeration panel assembly 100 includes three gas inlets 120. For illustrative purposes one of the inlets has a feed pipe 123 attached to it. The perforated upper portion and the lower portion of the aeration panel 101 form one or more cavities 106 through the use of seals 110 formed along the periphery 114 of the upper and lower portions as well as seals 110 formed along the longitudinal direction of the gas flow in the central regions 118 of the aeration panel 101. A gas outlet 122 is connected at a region in the aeration panel 101 that enhances the even distribution of gas throughout the panel.

In FIG. 3, a structural frame 108 is attached along the periphery 114 of the aeration panel 101. The structural frame 108 includes apertures along the sides of the frame to act as attachment points 124 for the anchoring device 112 so that the anchoring devices 112 which form an anchoring array can be fed through and/or attach to the structural frame 108. The anchoring device 112 can be anchor rods which can be adjustable so as to permit the leveling of the aeration panel relative to the surface of the liquid body. Alternatively, the structural frame 108 can be omitted and the anchoring device 112 can, for example, be attached at attachment points along the periphery 114 of the aeration panel 101 at apertures that are located outside of the seal 110 that runs along the periphery 114 but inside the outer edge of the aeration panel 101.

Figure 4:
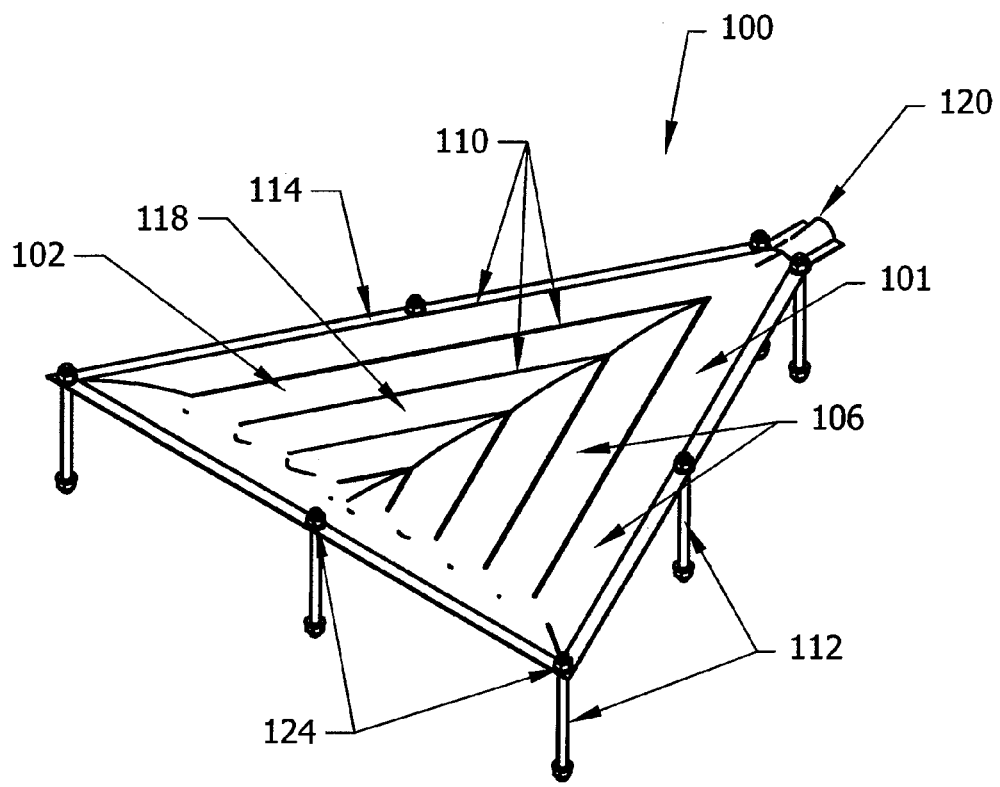
FIG. 4 is a perspective view showing a triangular, flexible aeration panel according to an embodiment of the present invention.

FIG. 4 shows an embodiment of the aeration panel assembly 100, which comprises an aeration panel 101 that is in the shape of a triangle. The aeration panel assembly includes one gas inlet 120. The perforated upper portion and the lower portion of the aeration panel form one or more cavities 106 through the use of seals 110 formed along the periphery 114 of the upper and lower portions as well as seals 110 formed in the central regions 118 of the aeration panel 101 that mirror the triangular shape of the aeration panel 101. The aeration panel 101 can be secured to the bottom of an aeration tank, container, basin, or the like through the use of anchoring devices 112, such as anchor rods. The anchoring device 112 can, for example, be attached at attachment points 124 along the periphery 114 of the aeration panel 101 at apertures that are located outside of the seal 110 that runs along the periphery 114 but inside the outer edge of the aeration panel 101. Alternatively, a triangular structural frame can be attached along the periphery 114 of the aeration panel with apertures along the frame to act as attachment points so that the anchoring device can be fed through and/or attached to the structural frame.

Figure 5:
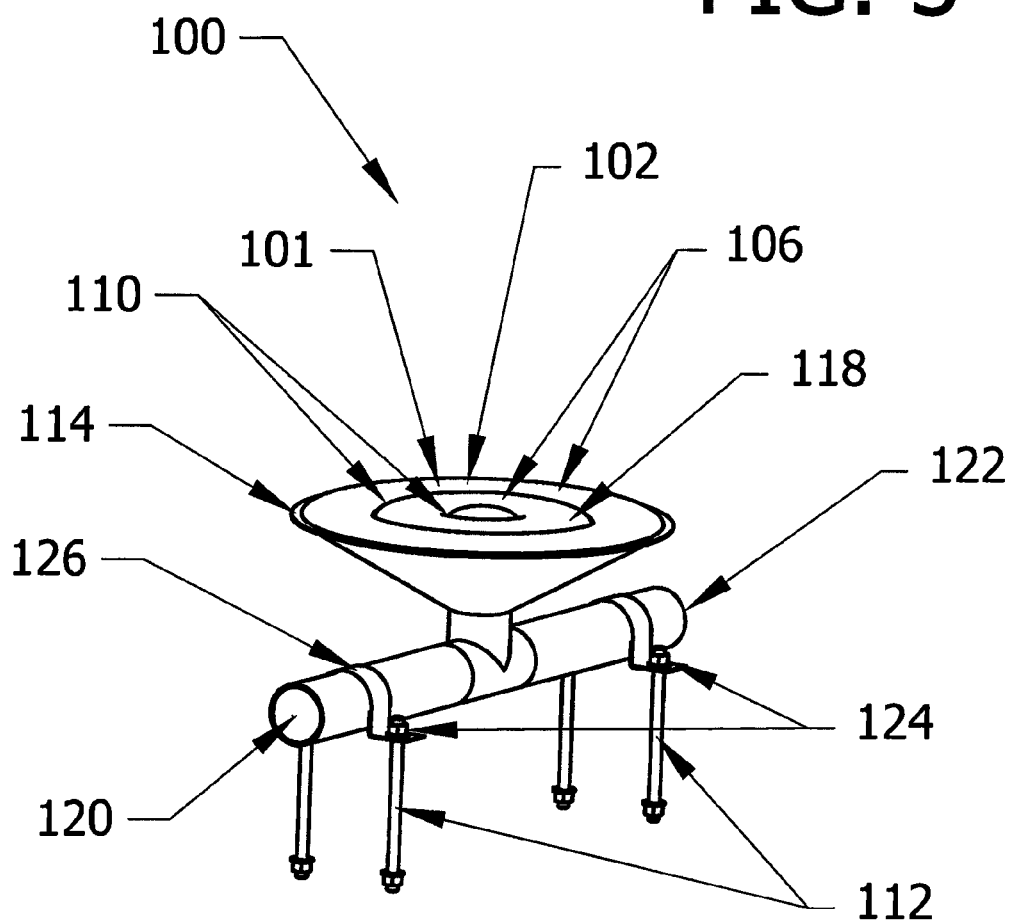
FIG. 5 is a perspective view showing a circular, flexible aeration panel according to an embodiment of the present invention.

FIG. 5 shows an embodiment of the aeration panel assembly 100, which comprises an aeration panel 101 that is in the shape of a circle. The aeration panel assembly includes one gas inlet 120 and one gas outlet 122 that are located on the opposite sides of the aeration panel 101. The gas outlet 122 can be connected to a feed pipe that leads to another gas inlet for another aeration panel assembly, which is connected in series with the depicted aeration panel assembly 100. The perforated upper portion and the lower portion of the aeration panel form one or more cavities 106 through the use of seals 110 formed along the periphery 114 as well as the central regions 118 of the aeration panel 101.

The aeration panel 101 can be secured to the bottom of an aeration tank, container, basin, or the like through the use of anchoring devices, such as anchor rods, that are connected to either the aeration panel 101, a structural frame attached to the periphery of the aeration panel, or the gas inlet and gas outlet. The anchoring device 112 can, for example, be anchor rods, clamps, or the like. For example, FIG. 5 shows that the gas inlet 120 and the gas outlet 122 are attached to the anchoring device 112 (such as anchor rods) via pipe clamps 126. The pipe clamps are attached to the anchoring devices by nuts such that the position of each pipe clamp 126 along its respective anchoring rod is adjustable so as to permit the top planar surface of the aeration panel 101 to be leveled relative to the top surface of the liquid body.

Figure 6:
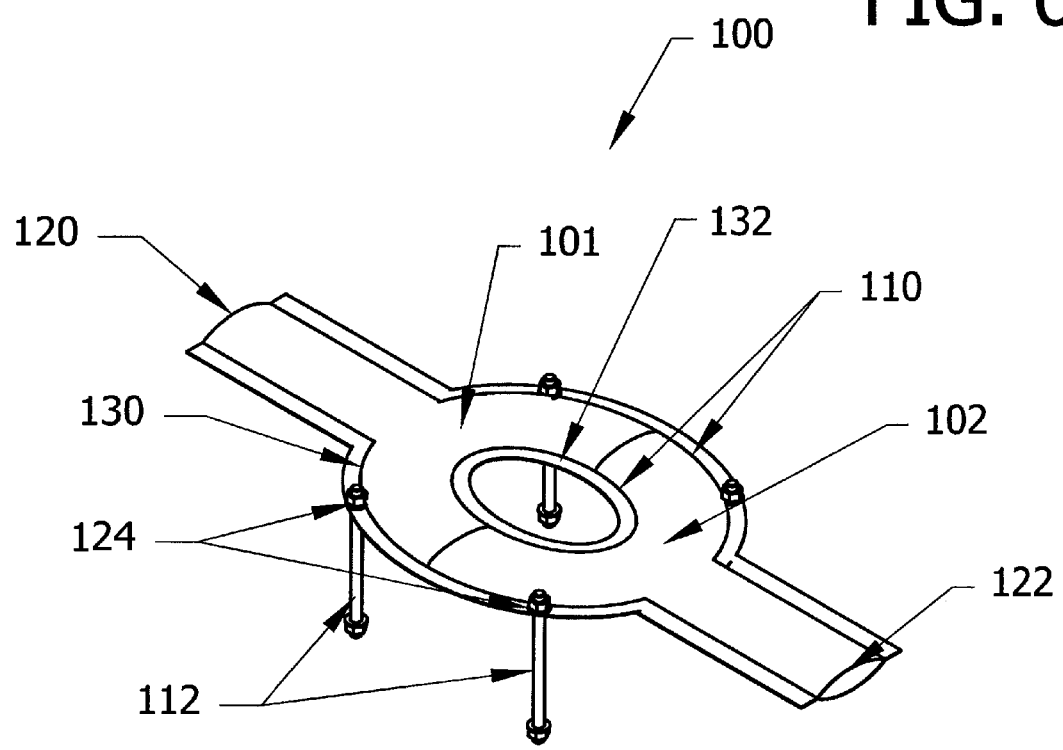
FIG. 6 is a perspective view showing an elliptical, flexible aeration panel according to an embodiment of the present invention.

FIG. 6 shows an embodiment of the aeration panel assembly 100, which comprises an aeration panel 101 that is in the shape of an ellipse. The aeration panel assembly includes one gas inlet 120 and one gas outlet 122 that are located on opposite sides of the aeration panel 101. The gas outlet 122 can be connected to a feed pipe that leads to another gas inlet for another aeration panel assembly, which is connected in series with the depicted aeration panel assembly 100. The perforated upper portion and the lower portion of the aeration panel form one cavity 106 through the use of seals 110 formed along the outer periphery 130 and the inner periphery 132 of the upper and lower portions. The aeration panel 101 can be secured to the bottom of an aeration tank, container, basin, or the like through the use of anchoring devices 112, such as anchor rods. The anchoring device 112 can, for example, be attached at attachment points 124 along the outer periphery 130 of the aeration panel 101 at apertures that are located outside of the seal 110 that runs along the outer periphery 130 but inside the outer edge of the aeration panel 101. Alternatively, a structural frame can be attached along the outer periphery 130 of the aeration panel with apertures along the frame to act as attachment points so that the anchoring device can be fed through and/or attached to the structural frame.

Figure 7:
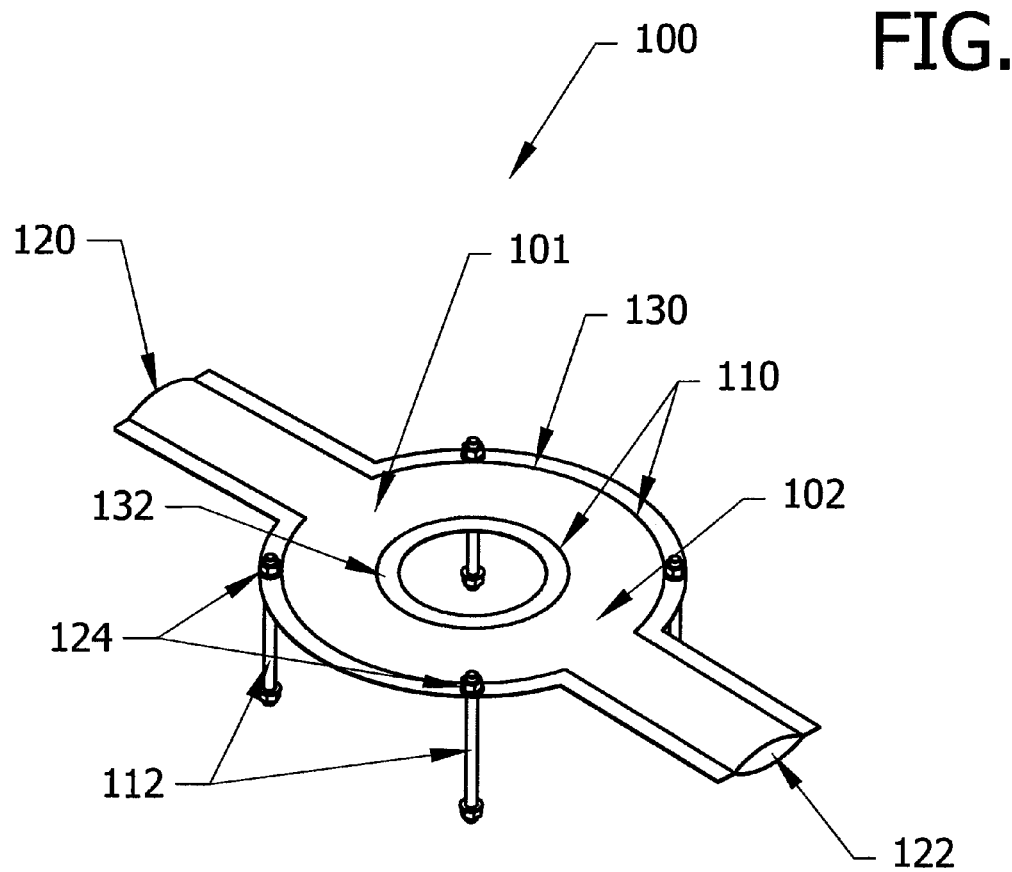
FIG. 7 is a perspective view showing a doughnut-shaped, flexible aeration panel according to an embodiment of the present invention.

FIG. 7 shows an embodiment of the aeration panel assembly 100, which comprises an aeration panel 101 that is in the shape of a doughnut. The aeration panel assembly includes one gas inlet 120 and one gas outlet 122 that are located on opposite sides of the aeration panel 101. The gas outlet 122 can be connected to a feed pipe that leads to another gas inlet for another aeration panel assembly, which is connected in series with the depicted aeration panel assembly 100. The perforated upper portion and the lower portion of the aeration panel form one cavity 106 through the use of seals 110 formed along the outer periphery 130 and the inner periphery 132 of the upper and lower portions. The aeration panel 101 can be secured to the bottom of an aeration tank, container, basin, or the like through the use of anchoring devices 112, such as anchor rods. The anchoring device 112 can, for example, be attached at attachment points 124 along the outer periphery 130 of the aeration panel 101 at apertures that are located outside of the seal 110 that runs along the outer periphery 130 but inside the outer edge of the aeration panel 101. Alternatively, a structural frame can be attached along the outer periphery 130 of the aeration panel with apertures along the frame to act as attachment points so that the anchoring device can be fed through and/or attached to the structural frame.

Figure 8:
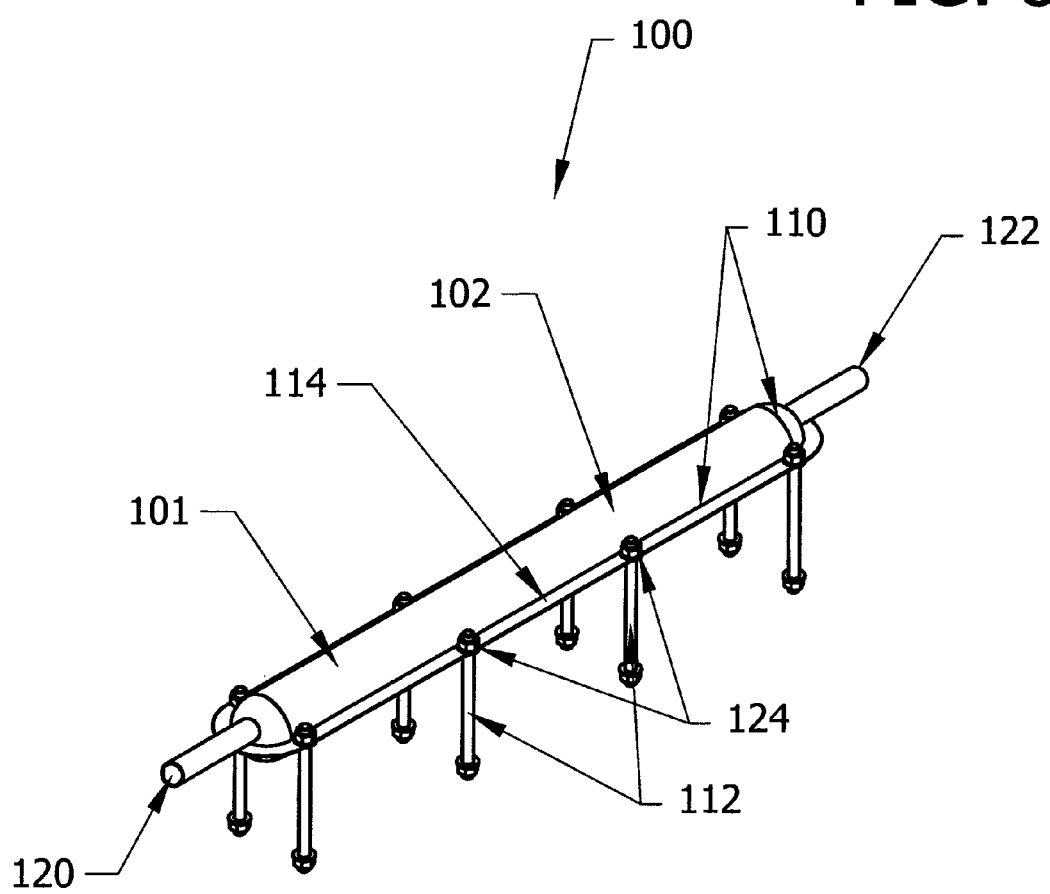
FIG. 8 is a perspective view showing a cylindrical, flexible aeration panel according to an embodiment of the present invention.

FIG. 8 shows an embodiment of the aeration panel assembly 100, which comprises an aeration panel 101 that is in the shape of a cylinder. The aeration panel assembly includes one gas inlet 120 and one gas outlet 122. The perforated upper portion 102 and the lower portion of the aeration panel form one cavity 106 through the use of a seal 110 formed along the outer periphery 114 of the upper and lower portions. The aeration panel 101 can be secured to the bottom of an aeration tank, container, basin, or the like through the use of anchoring devices 112, such as anchor rods. The anchoring device 112 can, for example, be attached at attachment points 124 along the periphery 114 of the aeration panel 101 at apertures that are located outside of the seal 110 that runs along the periphery 114 but inside the outer edge of the aeration panel 101. Alternatively, a structural frame can be attached along the periphery 114 of the aeration panel 101 with apertures along the frame to act as attachment points so that the anchoring device can be fed through and/or attached to the structural frame.

Figure 9:
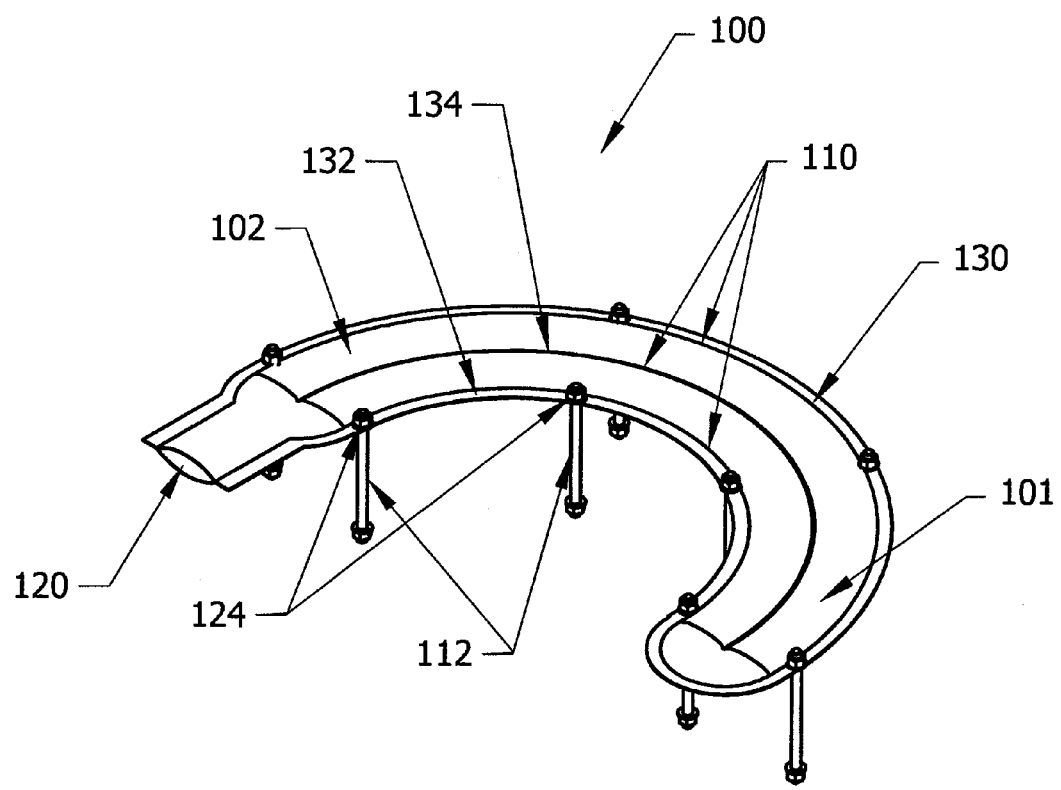
FIG. 9 is a perspective view showing a crescent-shaped, flexible aeration panel according an embodiment of the present invention.

FIG. 9 shows an embodiment of the aeration panel assembly 100, which comprises an aeration panel 101 that is in the shape of a crescent. The aeration panel assembly includes one gas inlet 120. The perforated upper portion 102 and the lower portion of the aeration panel form two cavities 106 through the use of seals 110 formed along the outer periphery 130 and the inner periphery 132 of the upper and lower portions, and an intermediary seal 134. The aeration panel 101 can be secured to the bottom of an aeration tank, container, basin, or the like through the use of anchoring devices 112, such as anchor rods. The anchoring device 112 can, for example, be attached at attachment points 124 along the outer periphery 130 and the inner periphery 132 of the aeration panel 101 at apertures that are located outside of the seal 110 that runs along the outer periphery 130 and the inner periphery 132 but inside the outer edge of the aeration panel 101. Alternatively, a structural frame can be attached along the outer periphery 130 of the aeration panel with apertures along the frame to act as attachment points so that the anchoring device can be fed through and/or attached to the structural frame.

Now, the method of manufacturing flexible aeration panels according to embodiments of the present invention will be described. An upper portion or sheet is perforated across the width of the sheet and then cut to a desired shape, such as those presented in FIGS. 1-9. However, a non-perforated portion is left along the periphery of the upper sheet. The lower non-perforated portion or sheet can then be cut to match the dimensions of the upper sheet. The upper and lower sheets are then placed one on top of the other and secured/sealed together. The sealing operation can be performed in a variety of ways as described above but can be preferably carried out through the use of radio frequency welding or a machine that applies clamping pressure and heating to both sheets. In this manner the upper and lower sheets are fused into a strong continuous, solid seam. The fused sheets may then be further cut and/or trimmed, as needed or desired. Mounting frame pockets can be preferably configured as attachment points to allow anchor protrusion. Then the assembled aeration panel is tested for leaks, air distribution, pressure drop and the like.

As previously mentioned, the aeration panel assembly can be used individually or in combination with other aeration panel assemblies within a liquid body. For example, in one embodiment, two or more aeration panel assemblies can be in series. In another example, three, four or five units are preferred in a series. Of course, it is recognized that any number of panels can be used in a single or multi-panel assembly configuration. If two or more aeration panel assemblies are used, a greater volume of the liquid body can be aerated at a particular time. Multiple aeration panel assemblies can be arranged, for example, in a discrete configuration as shown FIG. 10 or in a series configuration as shown in FIG. 11.

In FIG. 10, the multiple flexible aeration panel assemblies 100 can be arranged in a discrete configuration in which each aeration panel assembly has its own feed pipe 123. FIG. 10 shows one feed pipe 123 per aeration panel assembly in which the feed pipe 123 is connected to one gas inlet 120A while the other gas inlets 120B are sealed and not used. However, if more than one gas inlet of a particular aeration panel 101 is being used, each gas inlet of that particular aeration panel may either have its own feed pipe or the multiple gas inlets of that particular aeration panel are all connected to a single feed pipe. Also, in the embodiment of FIG. 10, the aeration panel assemblies do not have gas outlets.

In FIG. 11, the multiple flexible aeration panel assemblies 100 can be arranged in a series configuration in which the aeration panel assemblies are connected to each other such that one or more feed pipes 123 are connected to one or more gas inlets 120 of a first aeration panel assembly 100A. The gas flows through the aeration panel of the first aeration panel assembly 100A and exits out one or more gas outlets which are connected to the one or more gas inlets of a second aeration panel assembly 100B. Again, the gas flows through the aeration panel of the second aeration panel assembly 100B and exits out one or more gas outlets which are connected to one or more gas inlets of a third aeration panel assembly 100C. As before, the gas flows through the aeration panel of the aeration panel assembly 100C and exits out one or more gas outlets which are connected to one or more gas inlets of another aeration panel assembly 100D. Finally, the gas flows through the aeration panel of the aeration panel assembly 100D and exits out one or more gas outlets which are connected to one or more exit pipes 136, which may be connected to another aeration panel assembly. Although four assemblies 100A-100D are shown in FIG. 11, any number of assemblies are possible, such as two, three, four, five, or more.

Figure 12:
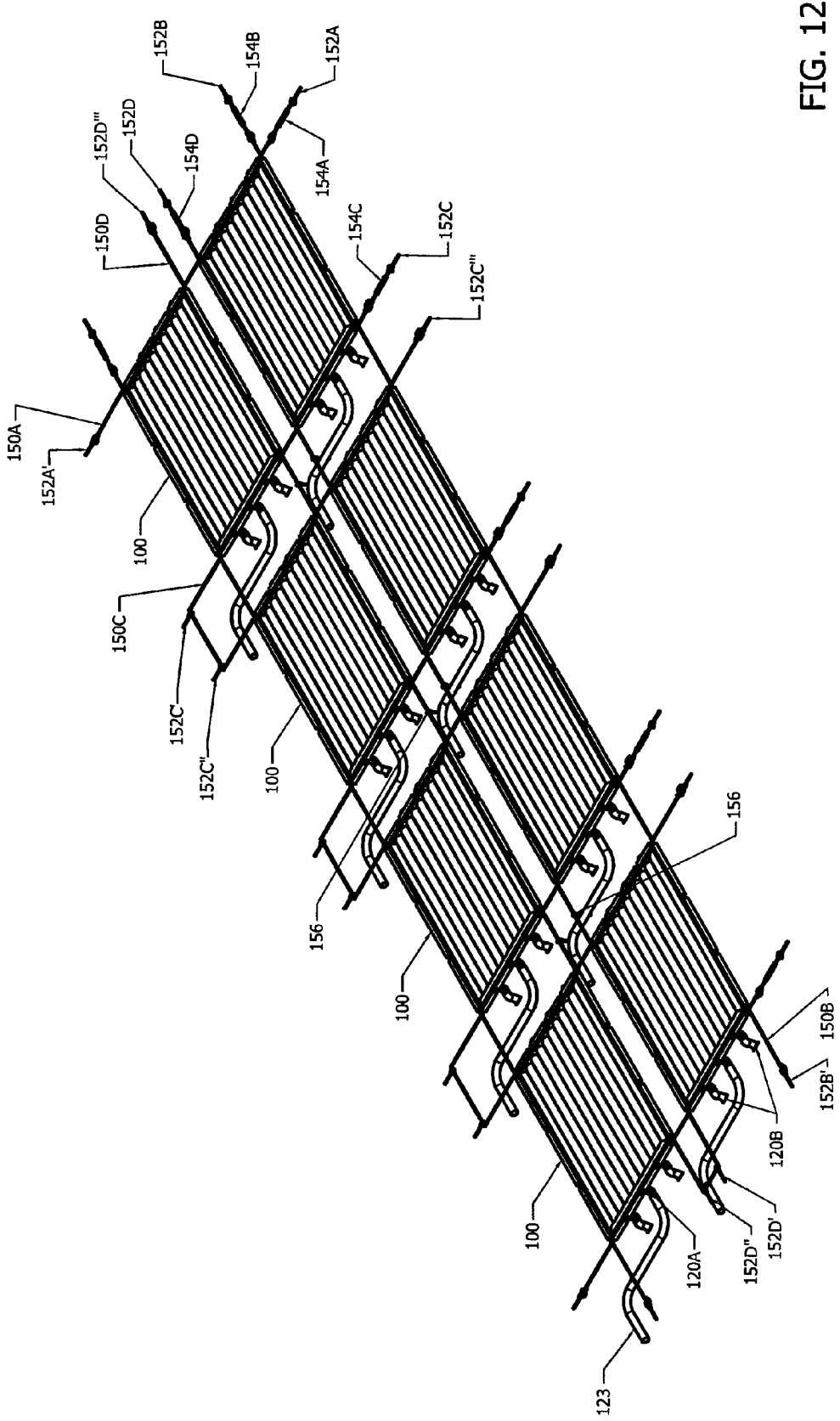
FIG. 12 is perspective view showing eight aeration panels assembled in a row and in a discrete configuration with anchoring cables according to an embodiment of the present invention.
Figure 13:
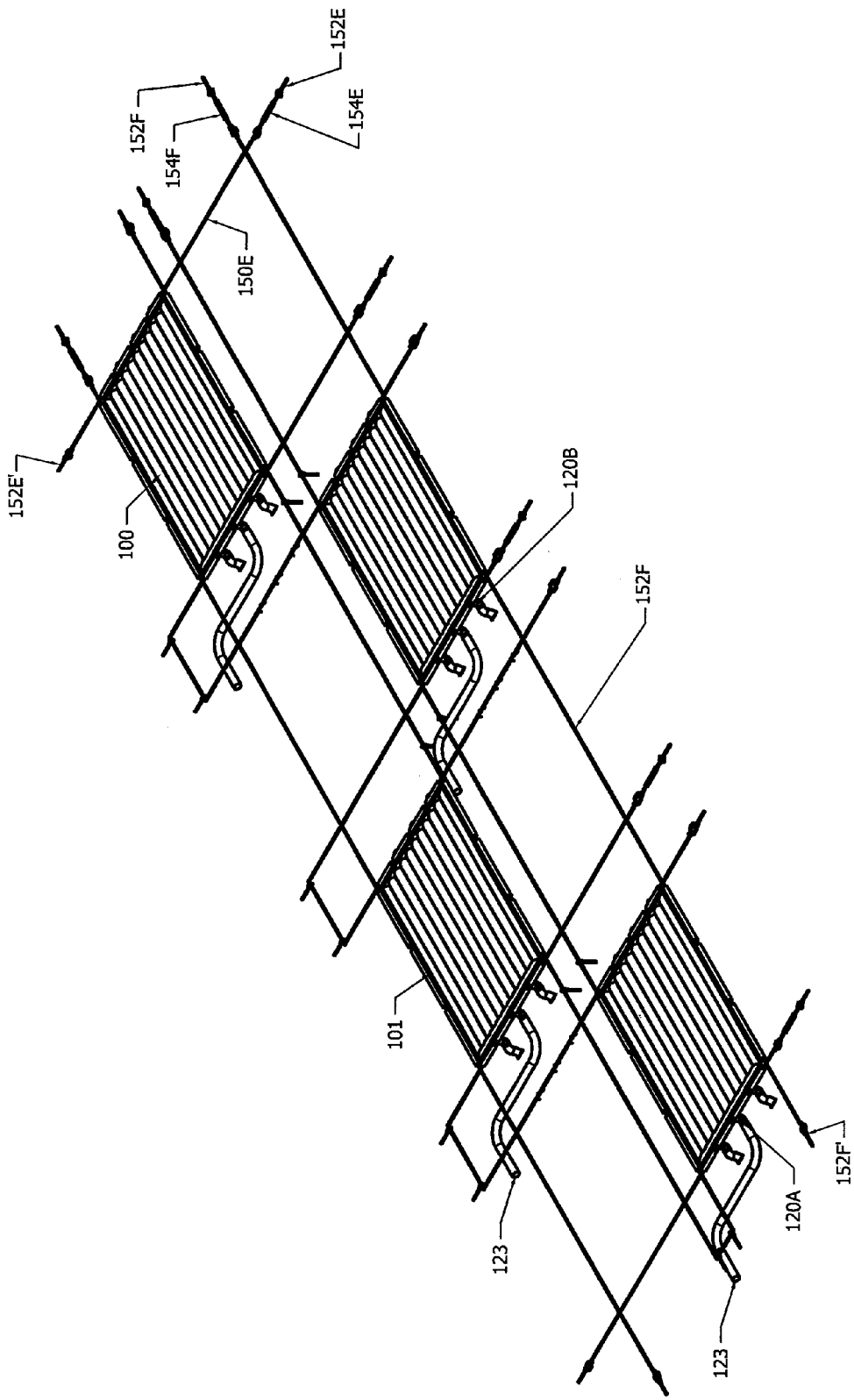
FIG. 13 is perspective view showing four aeration panels assembled in a staggered, discrete configuration with anchoring cables according to an embodiment of the present invention.
Figure 14:
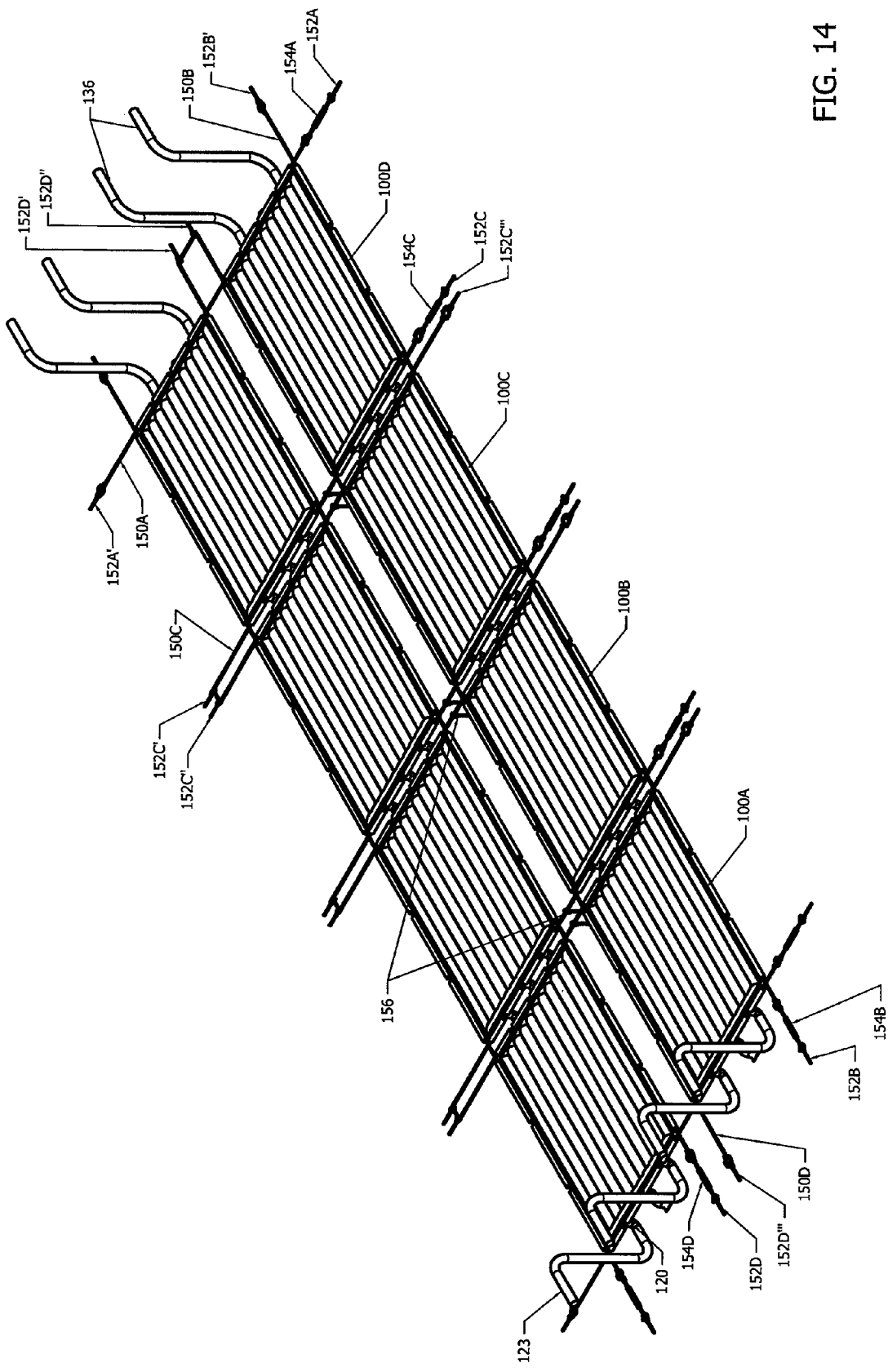
FIG. 14 is perspective view showing eight aeration panels assembled in two rows and in a series configuration with anchoring cables according to an embodiment of the present invention.

FIGS. 10 and 11 show a plurality of aeration panel assemblies that are configured in a row; however, other configurations are also possible, as shown in FIGS. 12-15. FIGS. 12 and 14 show two rows of aeration panel assemblies 100 in which there are four assemblies in each row. In FIG. 12, each of the eight assemblies are in a discrete configuration such that each aeration panel assembly 100 has its own feed pipe 123. Similarly to FIG. 10, one feed pipe 123 per aeration panel assembly is connected to one gas inlet 120A while the other gas inlets 120B are sealed and not used. Also, the aeration panel assemblies may or may not have gas outlets.

In contrast, FIG. 14 shows that each row of aeration panel assemblies is in a series configuration. Similar to the description of FIG. 11, the aeration panel assemblies are connected to each other such that one or more feed pipes 123 are connected to one or more gas inlets 120 of a first aeration panel assembly 100A. The gas flows through the aeration panel of the first aeration panel assembly 100A, exits out of the assembly 100A, flows into and through an aeration panel assembly 100B, exits out of the assembly 100B, flows into and through an aeration panel assembly 100C, exits out of the assembly 100C, flows into and through an aeration panel assembly 100D, and exits out of the assembly 100D into the one or more exit pipes 136. In the embodiment shown in FIG. 14, the gas flow in the two rows are isolated from each other but they could be connected to each other if desired.

Figure 15:
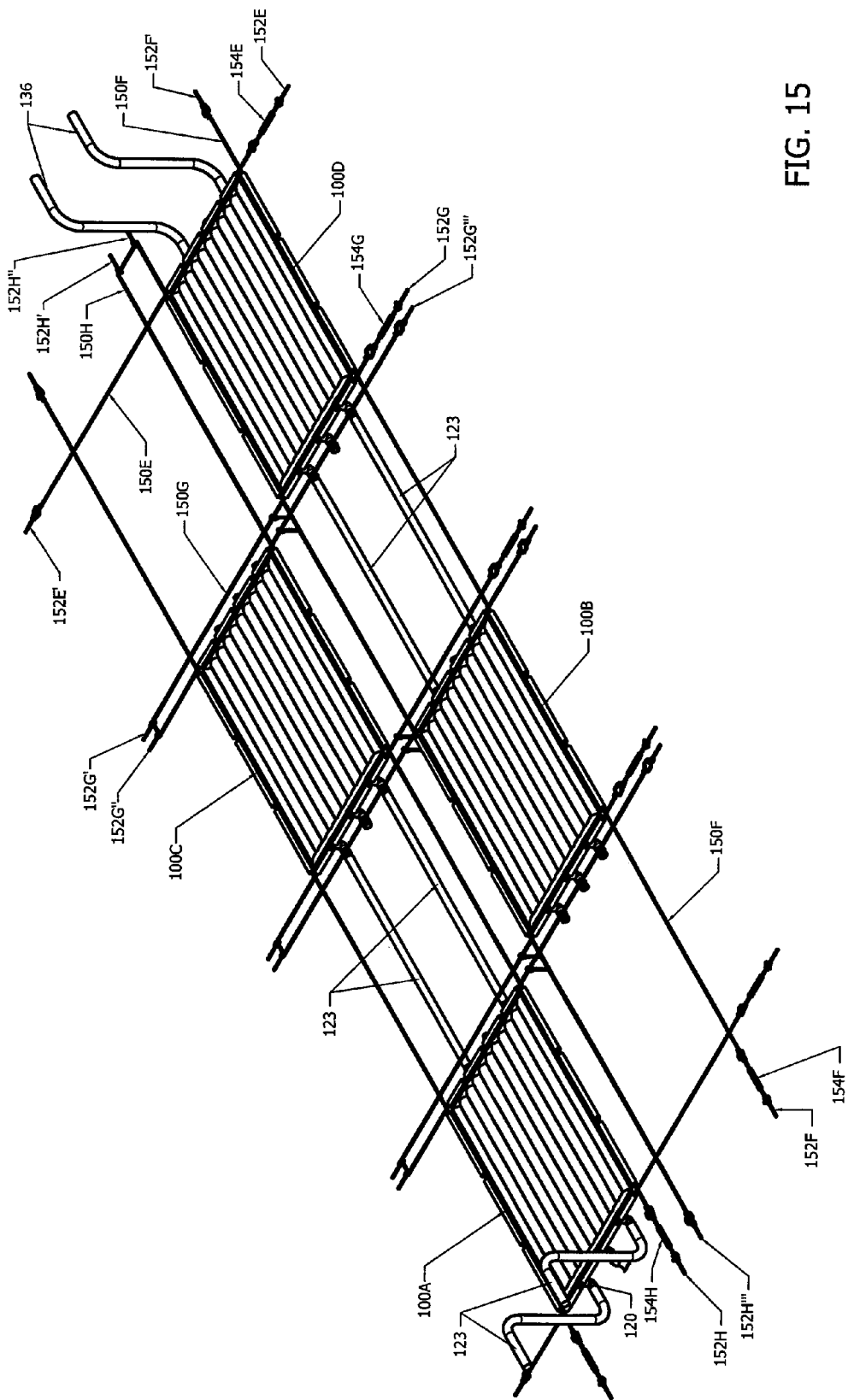
FIG. 15 is a perspective view showing four aeration panels assembled in a staggered, series configuration with anchoring cables according to an embodiment of the present invention.

FIGS. 13 and 15 show a staggered configuration of four aeration panel assemblies 100. In FIG. 13, each of the four assemblies 100 are in a discrete configuration such that each aeration panel assembly 100 has its own feed pipe 123. Similarly to FIGS. 10 and 12, one feed pipe 123 per aeration panel assembly is connected to one gas inlet 120A while the other gas inlets 120B are sealed and not used. Also, the aeration panel assemblies do not have gas outlets.

In contrast, FIG. 15 shows that the aeration panel assemblies are in a series, staggered configuration. Similar to the description of FIGS. 11 and 14, the two rows of aeration panel assemblies are shown in which each row has at least two aeration panel assemblies connected to each other. For example, one or more feed pipes 123 are connected to one or more gas inlets 120 of a first aeration panel assembly 100A. The gas flows through the aeration panel of the first aeration panel assembly 100A, exits out of the assembly 100A into a feed pipe which leads to the gas inlet of the assembly 100C, flows into and through the assembly 100C, and exits out of the assembly 100C into the one or more exit pipes (not shown). Meanwhile, one or more feed pipes (not shown) are connected to one or more gas inlets of the aeration panel assembly 100B. The gas flows through the aeration panel of the aeration panel assembly 100B, exits out of the assembly 100B into a feed pipe which leads to the gas inlet of the assembly 100D, flows into and through the assembly 100D, and exits out of the assembly 100D into the one or more exit pipes 136. As previously mentioned, it is recognized that any number of panels can be used in a multi-panel assembly configuration.

Referring back to FIGS. 10 and 11, these figures show a series of aeration panel assemblies in which each aeration panel assembly includes a structural frame 108 connecting the aeration panel 101 to the anchoring device 112. For example, the anchoring devices can be imbedded in concrete so as to secure the aeration panel assemblies to the bottom of an aeration tank, basin, container, or the like. However, other types of anchoring devices can be used as shown in FIGS. 12-15.

FIGS. 12-15 show that the aeration panels 101 can be restrained by an anchoring array in the form of a substantially planar array of cables 150 in tension. For example, the restraining cables 150 can be anchored to the walls and/or to the floor of the aeration tank, basin, container, or the like. In the case of the restraining cables being anchored to the wall, the anchoring device can comprise an anchoring base (such as an eyebolt) that is imbedded into the wall of the tank, basin, container, or the like, for example, the anchoring base is imbedded in concrete. A turnbuckle is connected between the anchoring base and one end of the cable so as to provide tension to the cables that are attached to or fed through the attachment points (such as apertures) of the aeration panel assembly, such as at a structural frame or at the aeration panel itself. The cables 150 can take any known form such as wires, chains, ropes, or the like.

FIGS. 12 and 14 shows several embodiments of the anchoring device. In one embodiment, the sides of two aeration panel assemblies are held in place by a single cable 150A, two anchoring bases 152A and 152A' imbedded into opposite concrete walls, and a turnbuckle 154A. The cable 150A is attached to one anchoring base 152A via the turnbuckle 154A and then is fed through or attached to the attachment points in the structural frame of the two aeration panel assemblies. The other end of the cable 150A is then attached to the other anchoring base 150A'. The cable 150A is tensioned through the use of the turnbuckle 154A.

In a second embodiment, the sides of four aeration panel assemblies are held in place by a single cable 150B, two anchoring bases 152B and 150B' imbedded into opposite concrete walls, and a turnbuckle 154B. The cable 150B is attached to one anchoring base 152B via the turnbuckle 154B and then is fed through or attached to the attachment points in the structural frame of the four aeration panel assemblies. The other end of the cable 150B is then attached to the other anchoring base 150B'. The cable 150B is tensioned through the use of the turnbuckle 154B.

In a third embodiment of the anchoring device, the sides of four aeration panel assemblies are held in place through the use of a single cable 150C, four anchoring bases 152C, 152C', 152C", and 152C'" imbedded into two opposite concrete walls, and a turnbuckle 154C. The cable 150C is attached to one anchoring base 152C via the turnbuckle 154C and then is fed through or attached to the attachment points in the structural frame of two aeration panel assemblies. Next, the cable 150C is fed through the anchoring bases 152C' and 125C" that are attached to the opposite wall and then fed through or attached to the attachment points in the structural frame of the other two aeration panel assemblies. The cable 150C then terminates and is attached to the other anchoring base 150C'". The cable 150C is tensioned through the use of the turnbuckle 154C. In another embodiment, the anchoring bases 152C' and 152C" can be replaced with a single anchoring base.

In a fourth embodiment of the anchoring device, the sides of eight aeration panel assemblies are held in place through the use of a single cable 150D, four anchoring bases 152D, 152D', 152D", and 152D'" imbedded into two opposite concrete walls, and a turnbuckle 154D. The cable 150D is attached to one anchoring base 152D via the turnbuckle 154D and then is fed through or attached to the attachment points in the structural frame of four aeration panel assemblies. Next, the cable 150D is fed through the anchoring bases 152D' and 125D" that are attached to the opposite wall and then fed through or attached to the attachment points in the structural frame of the other four aeration panel assemblies. The cable 150D then terminates and is attached to the other anchoring base 150D'''. The cable 150D is tensioned through the use of the turnbuckle 154D. In another embodiment, the anchoring bases 152D' and 152D'' can be replaced with a single anchoring base.

FIGS. 13 and 15 shows several other embodiments of the anchoring device. In fifth embodiment, one side of an aeration panel assembly is held in place by a single cable 150E, two anchoring bases 152E and 150E' imbedded into opposite concrete walls, and a turnbuckle 154E. The cable 150E is attached to one anchoring base 152E via the turnbuckle 154E and then is fed through or attached to attachment points in the structural frame of the aeration panel assembly. The other end of the cable 150E is then attached to the other anchoring base 150E'. The cable 150E is tensioned through the use of the turnbuckle 154E.

In a sixth embodiment, the sides of two aeration panel assemblies are held in place by a single cable 150F, two anchoring bases 152F and 152F' imbedded into opposite concrete walls, and a turnbuckle 154F. The cable 150F is attached to one anchoring base 152F via the turnbuckle 154F and then is fed through or attached to attachment points in the structural frame of the two aeration panel assemblies. The other end of the cable 150F is then attached to the other anchoring base 150F'. The cable 150F is tensioned through the use of the turnbuckle 154F.

In a seventh embodiment of the anchoring device, the sides of two aeration panel assemblies are held in place through the use of a single cable 150G, four anchoring bases 152G, 152G', 152G'', and 152G''' imbedded into two opposite concrete walls, and a turnbuckle 154G. The cable 150G is attached to one anchoring base 152G via the turnbuckle 154G and then is fed through or attached to the attachment points in the structural frame of one aeration panel assembly. Next, the cable 150G is fed through the anchoring bases 152G' and 125G'' that are attached to the opposite wall and then fed through or attached to the attachment points in the structural frame of the other aeration panel assembly. The cable 150G then terminates and is attached to the other anchoring base 150G'''. The cable 150G is tensioned through the use of the turnbuckle 154G. In another embodiment, the anchoring bases 152G' and 152G'' can be replaced with a single anchoring base.

In an eighth embodiment of the anchoring device, the sides of four aeration panel assemblies are held in place through the use of a single cable 150H, four anchoring bases 152H, 152H', 152H'', and 152H''' imbedded into two opposite concrete walls, and a turnbuckle 154H. The cable 150H is attached to one anchoring base 152H via the turnbuckle 154H and then is fed through or attached to the attachment points in the structural frame of two aeration panel assemblies. Next, the cable 150H is fed through the anchoring bases 152H' and 125H'' that are attached to the opposite wall and then fed through or attached to the attachment points in the structural frame of the other two aeration panel assemblies. The cable 150H then terminates and is attached to the other anchoring base 150H'. The cable 150D is tensioned through the use of the turnbuckle 154H. In another embodiment, the anchoring bases 152H' and 152H'' can be replaced with a single anchoring base.

In the case of restraining cables being anchored to the floor, a floor anchoring retainer 156 (such as a turnbuckle or eye-bolt) is used in conjunction with the anchoring base 152 so as to restrain the cables 150 in the direction perpendicular to the substantially planar array. In one embodiment, the floor anchoring retainer 156 creates a tensile force on the cables by either pulling or pushing the cable out of the plane of the substantially planar array; thus, caused a diversion of the cable such that the cable transverses a greater distance. The slack is taken out of the cables because of the greater distance and the fact that the cable is still the same length as before. FIGS. 12-13 show that an anchoring array that comprises a plurality of floor anchoring retainers 156 that can be located along a length of cable 150 so as to secure a plurality of aeration panel assemblies 100 along the bottom of an aeration tank or the like. In addition, the anchoring retainer 156 can be used to help level the one or more aeration panels because the pull or pushing of the cable out of the plane of the planar array can cause the heights of the attachment points relative to each other to be changed; thus changing the direction in which the top and bottom planar surfaces of the aeration panel run relative to the surface of the liquid body. By adjusting the heights of various attachment points, one or more panel assemblies can be leveled relative to the surface of the liquid body.

Figure 17:
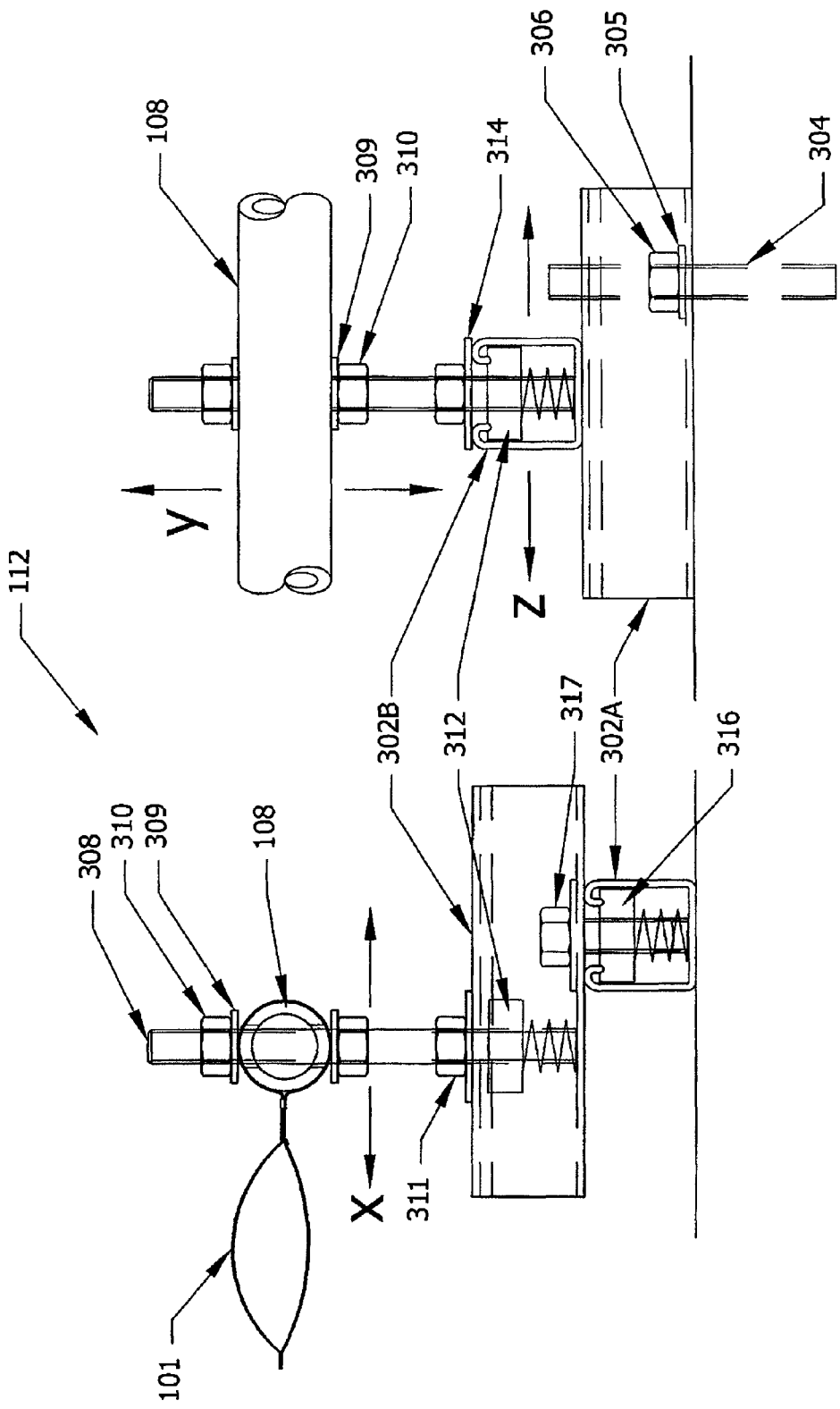
FIG. 17 is a front and side view of an anchoring device according to an embodiment of the present invention.

FIG. 17 shows another embodiment of the present invention which shows another configuration for the anchoring device 112 which is used in an anchoring array for an adjustable structural frame 108 around the aeration panel 101. The anchoring device comprises two strut channels 302A and 302B. The strut channel 302A is fixed to the floor of the liquid body by an anchor rod 304, a flat washer 305, and a nut 306 (shown in the right-side view but not the left-side view of FIG. 17) so that the strut channel 302A does not move relative to the floor. The strut channel 302B lays on top of the strut channel 302A, and can slide over the strut channel 302A so as to be placed in any desired position in the Z direction along the strut channel 302A; thus moving relative to the anchor rod 304. Once the desired position in the Z direction is determined, the strut channel 302B is secured to the strut channel 302A through the use of a bolt 317 (with a washer) that screws into a spring nut 316 located inside the strut channel 302A (shown in the left-side view but not the right-side view of FIG. 17) so when the bolt 317 is tightened toward the spring nut 316 the struts become fixed to each other.

The structural frame 108 is also attached to the anchoring device 112 so that it can move in the X and Y directions. This is accomplished through an anchor rod 308 that is fed through the structural frame 108, through a nut 311 and a fender washer 314, into the channel of the strut channel 302B, and then loosely screwed into a spring nut 312. The anchor rod 308, the structural frame 108, and the spring nut 312 can move as a single unit in the X direction along the strut channel 302B so as to be placed into a desired location. Once the desired location in the X direction is determined, the nut 311 is screwed tightly in the direction of the spring nut 312 so as to secure the anchor rod 308 into a fixed position relative to the strut channel 302B.

As to the Y direction, the structural frame 108 is sandwiched between two nuts 310 with corresponding washers 310 on the anchor rod 308. The structural frame 108 can then be moved long the longitudinal direction of the anchor rod 308 by screwing the lower nut 310 up or down the rod. Once a desired location along the anchor rod is determined, the upper nut 310 is screwed in the direction of the lower nut 310 so as to secure the structural frame 108 into a fixed position relative to the anchor rod. Therefore, the configuration of FIG. 17 can allow the movement of the structural frame 108 in the X, Y and Z directions, thus making it easy to adjust the anchoring array for an adjustable or expandable frame 108.

Thus, an aeration panel can have an array with the kind of anchoring device 112 depicted in FIG. 17 so that the placement of the aeration panel can be adjusted as well as being able to use an adjustable or expandable frame 108. An example of an expandable frame 108 according to an embodiment of the present invention is a frame made from poly(vinyl chloride) ("PVC") in which the frame can be made adjustable using one or more compression couplings on one or more sides of the frame. For example, if the structural frame 108 is rectangular as shown in FIG. 1, one compression coupling can be used on each side of the frame which results in four compression couplings. These couplings could be installed at the center of each side. Such a configuration would allow the structural frame 108 to grow if needed to keep the aeration panel stretched so as to avoid a major bow or sag in the aeration panel. During installation, all the PVC pipe sections of the structural frame 108 can be fully inserted into the coupling. To expand the frame, simply unscrew the sides of the compression coupling and pull the PVC pipe out a little bit, enough to keep the aeration panel stretched, then re-tighten the coupling.

Figure 16:
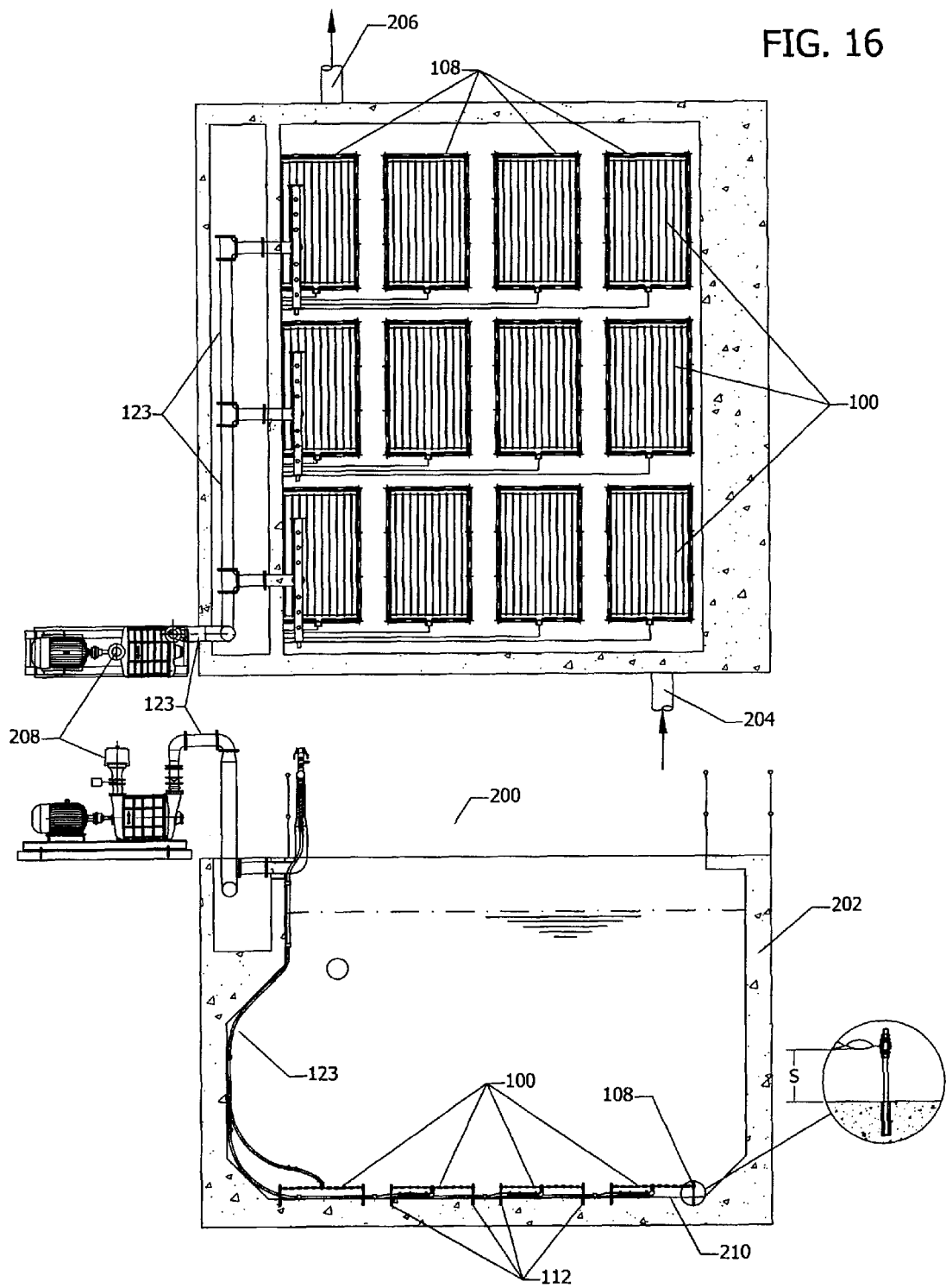
FIG. 16 is a top view, a side view, and a detailed view of a discrete configuration of the aeration panel assemblies used in a wastewater treatment system according to an embodiment of the present invention.

FIG. 16 shows one application of the aeration panel assembly according to one exemplary embodiment of the present invention. A wastewater treatment system 200 comprises a basin treatment tank 202, a wastewater inlet line 204, an effluent discharge outlet line 206, and a gas source 208. A series of aeration panel assemblies 100 in a discrete configuration can installed by attachment to the bottom 210 of the tank 202 through the use of the anchoring device 112. In one embodiment and as seen in the detailed view, the aeration panel assemblies 100 can be spaced a distance S of about 0.1 m to about 0.5 m from the bottom 210 of the tank 202, preferably about 0.15 m to about 0.2 m from the bottom 210 of the tank 202. The wastewater can be introduced from the wastewater inlet line 204 into the tank 202 so as to completely cover the aeration assembly 100. Gas, such as air, can be delivered to the aeration panel assembly 210 via the feed pipe 123 from the gas source 208. The gas source can be, for example, a blower or compressed gas. The gas passes through the aeration panel assembly 100 creating bubbles over the upper surface of the aeration panel; thereby aerating the wastewater. The treated wastewater can be the be discharged out using the discharge outlet line 206.

With the aeration panel assembly thus described, the method of distributing gas through a liquid body will now be described. According to one embodiment of the present invention, gas distribution through a liquid body can be accomplished by positioning within the liquid body one or more flexible aeration panels 101. Each aeration panel can have at least one inlet 120 and at least an upper portion 102 and a lower portion 104 in which the portions define at least one cavity 106 that can be filled with a gas under pressure. The pressurized gas flows to each panel 100 and into the at least one cavity 106 via the at least one inlet 120, and the upper portion 102 of each panel 100 is perforated to allow the pressurized gas to escape in the form of bubbles from the upper portion 102 of each panel 102. Next, a source of the pressurized gas is provided, and the pressurized gas is permitted to flow to each panel 100 and into the at least one cavity 106 via the at least one inlet 120.

Another embodiment of the present invention can comprise a method of distributing a gas through a liquid body in which one or more flexible aeration panels 101 are positioned within the liquid body. Each aeration panel 101 can have at least one inlet 120 and at least an upper portion 102 and a lower portion 104 wherein the portions define at least one cavity 106 that can be filled with a gas under pressure. The pressurized gas flows to each aeration panel 101 and into the at least one cavity 106 via the at least one inlet 120. The upper portion 102 of each aeration panel 102 is perforated to allow the pressurized gas to escape from the upper portion 102 of each aeration panel 102 in a manner that provides a substantially uniform, unbroken pattern of gas bubbles over a substantial area thereof. Next, a source of the pressurized gas is provided, and the pressurized gas is permitted to flow to each aeration panel 101 and into the at least one cavity 106 via the at least one inlet 120.

From the above disclosure, various embodiments of the present invention can overcome the prior art limitations by providing a system and method which is highly reliable, relatively economical in manufacture, cost effective in installation, and allows for relatively high flow rates of gases into treated wastewater.

Various embodiments of the present invention can provide one or more flexible aeration panels and associated assemblies, which are simple and convenient to manufacture, transport and install. Large flexible aeration panels of relatively thin, light-weight materials can be provided that can be stacked or rolled for easy transportation, but can provide a relatively rigid overall structure in operation (without resorting to the use of a rigid support panel), and can assure uniform gas distribution at high rates throughout the panel, by avoiding any substantial billowing of the panel. The flexible aeration panel can be used in a variety of applications, for example, for the aeration of water tanks, water basins, or sludge. The aeration panel can also be utilized in various aerobic water processes.

The perforations in the upper portion of the aeration panel can produce bubbles formed by holes, slits, cuts, or combinations thereof. The overall aeration panel may be any desired shape such as a square, a rectangle, a triangle, a circle, an ellipse, a doughnut, a cylinder, an arc, a half moon, a cube, a pyramid, a cone, or a prism. Additionally, the position of the aeration panels can be arranged in a variety of configurations. For example, aeration panels could be in rows or staggered as required by the surface coverage. Further, the aeration panel assembly may be anchored at or near the bottom of the liquid body via anchor rods, cable, spikes, or pegs. The anchor points may include adjustment hardware for leveling the assembly.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An aeration panel assembly for distributing a gas through a liquid body comprising:
   at least two flexible aeration panels in which each panel comprises:
      (i) at least one inlet; and
      (ii) at least an upper portion and a lower portion, which portions define at least one cavity in fluid communication with the at least one inlet and capable of being filled with a gas under pressure, the upper portion being perforated to allow pressurized gas to escape therefrom in the form of bubbles, whereby the at least upper portion and lower portion of the panel are constructed of one or more flexible, non-rigid elastomeric materials,
   wherein the at least two flexible aeration panels are at a spaced distance from each other such that a spatial gap is present between the at least two flexible aeration panels, and wherein the at least two aeration panels are connected in series such that gas from one aeration panel flows into the inlet of another aeration panel.

2. The aeration panel assembly of claim 1, in which the perforations are selected from holes, slits, cuts, or combinations thereof.

3. The aeration panel assembly of claim 1, in which the at least upper portion and lower portion are comprised of flexible, non-rigid elastomeric sheets whose edges are sealed.

4. The aeration panel assembly of claim 1, in which an anchoring array attached around a periphery of one of the panels permits a leveling of the flexible panel relative to a surface of the liquid body.

5. The aeration panel assembly of claim 4, in which the anchoring array comprises at least one cable, at least two anchoring bases, and a turnbuckle.

6. The aeration panel assembly of claim 5, in which the one cable is attached to a side of each of the at least two aeration panels.

7. The aeration panel assembly of claim 6, in which the at least one cable is one of a wire, chain, and rope.

8. The aeration panel assembly of claim 1, wherein the spatial gap between the at least two flexible aeration panels is formed by a lack of abutting physical contact between the at least two flexible aeration panels.

9. An aeration panel assembly for distributing a gas through a liquid body comprising:
   at least two flexible aeration panels in which each panel comprises:
   (i) at least one inlet; and
   (ii) at least an upper portion and a lower portion, which portions define at least one cavity in fluid communication with the at least one inlet and capable of being filled with a gas under pressure, the upper portion being perforated to allow pressurized gas to escape therefrom in the form of bubbles, whereby the at least upper portion and lower portion of the panel are constructed of one or more flexible, non-rigid elastomeric materials,
   wherein the at least two aeration panels are connected in series such that gas from one aeration panel flows into the inlet of another aeration panel,
   in which an anchoring array attached around a periphery of one of the panels permits a leveling of the flexible panel relative to a surface of the liquid body, and
   in which the anchoring array comprises at least one cable, at least two anchoring bases, and a turnbuckle.

10. The aeration panel assembly of claim 9, in which the perforations are selected from holes, slits, cuts, or combinations thereof.

11. The aeration panel assembly of claim 9, in which the at least upper portion and lower portion are comprised of flexible, non-rigid elastomeric sheets whose edges are sealed.

12. The aeration panel assembly of claim 9, in which the one cable is attached to a side of each of the at least two aeration panels.

13. The aeration panel assembly of claim 12, in which the at least one cable is one of a wire, chain, and rope.

* * * * *